US011235713B2

(12) United States Patent
Komiya et al.

(10) Patent No.: US 11,235,713 B2
(45) Date of Patent: Feb. 1, 2022

(54) TRACTOR

(71) Applicant: YANMAR CO., LTD., Osaka (JP)

(72) Inventors: Toshitaka Komiya, Osaka (JP); Yutaka Matsui, Osaka (JP); Tomoyuki Kuroda, Osaka (JP)

(73) Assignee: YANMAR POWER TECHNOLOGY CO. LTD., Osaka (JP)

( * ) Notice: Subject to any disclaimer, the term of this patent is extended or adjusted under 35 U.S.C. 154(b) by 65 days.

(21) Appl. No.: 16/801,397

(22) Filed: Feb. 26, 2020

(65) Prior Publication Data
US 2020/0189493 A1 Jun. 18, 2020

Related U.S. Application Data

(63) Continuation of application No. 15/575,740, filed as application No. PCT/JP2016/059062 on Mar. 22, 2016, now Pat. No. 10,604,088.

(30) Foreign Application Priority Data

May 22, 2015 (JP) .................................. 2015-104322
May 27, 2015 (JP) .................................. 2015-108012

(51) Int. Cl.
*B60R 13/08* (2006.01)
*B62D 25/08* (2006.01)
(Continued)

(52) U.S. Cl.
CPC ........ *B60R 13/0838* (2013.01); *B62D 25/082* (2013.01); *B62D 25/14* (2013.01);
(Continued)

(58) Field of Classification Search
CPC ... B60R 13/0838; B60R 13/08; B62D 25/082; B62D 49/06; B62D 25/14;
(Continued)

(56) References Cited

U.S. PATENT DOCUMENTS 1,704,210 A * 3/1929 Race ...................... B60K 11/04
180/69.2
1,738,438 A * 12/1929 Lehmann ............... B60K 11/04
165/98

(Continued)

FOREIGN PATENT DOCUMENTS

CN 109398261 A * 3/2019 ............. B60K 11/04
DE 102010037617 A1 * 3/2012 ................ B60T 5/00
(Continued)

OTHER PUBLICATIONS

Japanese Office Action dated Oct. 2, 2018 issued in corresponding JP Application 2015-108012.
(Continued)

*Primary Examiner* — Karen Beck
(74) *Attorney, Agent, or Firm* — Norton Rose Fulbright US LLP

(57) ABSTRACT

A tractor in which a basic shape of a hot-wind blocking plate disposed between a motor unit and an operation unit is commonalized as a sharable element, and cutting of an outer edge portion of the hot-wind blocking plate enables application to various specifications including different sizes of motors and operation units, thus achieving convenience in assembling the tractor, enabling mass production by using the sharable element, enabling an efficient inventory storage, and providing an advantage in costs. The tractor includes: a hot-wind blocking plate disposed between a motor unit and an operation unit, the dimension of the hot-wind blocking plate being adjustable by cutting an outer edge portion of the blocking plate; and an operation unit component mounted in the outer edge portion of the hot-wind blocking plate, a position where the operation unit component is mounted is changeable depending on a specification of the operation unit.

20 Claims, 33 Drawing Sheets

(51) Int. Cl.
    *B60K 11/04*      (2006.01)
    *B62D 25/10*      (2006.01)
    *B62D 49/06*      (2006.01)
    *B62D 25/14*      (2006.01)
    *B62D 33/06*      (2006.01)
    *B60K 13/04*      (2006.01)
    *B62D 49/00*      (2006.01)

(52) U.S. Cl.
    CPC ......... *B62D 33/0617* (2013.01); *B62D 49/06* (2013.01); *B60K 11/04* (2013.01); *B60K 13/04* (2013.01); *B62D 25/10* (2013.01); *B62D 49/00* (2013.01); *Y02A 50/20* (2018.01)

(58) Field of Classification Search
    CPC .... B62D 33/0617; B62D 25/10; B62D 49/00; Y02A 50/20; B60K 11/04; B60K 13/04
    See application file for complete search history.

(56) References Cited

U.S. PATENT DOCUMENTS

| | | | |
|---|---|---|---|
| 2,100,490 A * | 11/1937 | Rippingille | B60K 11/04 180/68.1 |
| 2,127,409 A * | 8/1938 | Klavik | B62D 25/082 180/68.1 |
| 4,106,582 A * | 8/1978 | De Bella | B60K 25/00 280/727 |
| 4,164,262 A | 8/1979 | Skatsche et al. | |
| 4,610,326 A * | 9/1986 | Kirchweger | B60K 11/08 123/41.62 |
| 4,850,444 A | 7/1989 | Nowski et al. | |
| 5,718,303 A | 2/1998 | Ogasawara et al. | |
| 8,347,994 B2 * | 1/2013 | Bering | F01P 11/10 180/68.3 |
| 8,689,925 B2 | 4/2014 | Ajisaka | |
| 9,688,134 B2 * | 6/2017 | Boeshans | F01N 3/103 |
| 2003/0057005 A1 * | 3/2003 | Nagai | B60K 11/08 180/68.1 |
| 2005/0252635 A1 * | 11/2005 | Adamson | F02B 29/0431 165/41 |
| 2006/0000653 A1 * | 1/2006 | Telford | B62D 25/10 180/69.21 |
| 2011/0120791 A1 | 5/2011 | Greenwood et al. | |
| 2011/0139525 A1 * | 6/2011 | Karl | B60K 11/08 180/68.1 |
| 2012/0261202 A1 * | 10/2012 | Bering | B60K 11/08 180/68.1 |
| 2014/0083791 A1 * | 3/2014 | Togo | F01N 3/08 180/309 |
| 2014/0124283 A1 * | 5/2014 | Novacek | B60K 13/04 180/309 |
| 2014/0238767 A1 | 8/2014 | Numa | |
| 2014/0251713 A1 | 9/2014 | Aoyama et al. | |
| 2015/0068470 A1 | 3/2015 | Tsutsumi et al. | |
| 2015/0274208 A1 | 10/2015 | Segawa et al. | |
| 2016/0096426 A1 * | 4/2016 | Kurokawa | F01N 13/0097 180/309 |
| 2016/0375758 A1 | 12/2016 | Komatsu | |
| 2017/0072786 A1 | 3/2017 | Kurokawa | |
| 2017/0129325 A1 | 5/2017 | Kaneko et al. | |
| 2017/0217473 A1 | 8/2017 | Higashiguchi | |
| 2017/0349040 A1 | 12/2017 | Nagaosa | |
| 2018/0118134 A1 | 5/2018 | Komiya et al. | |
| 2018/0222313 A1 | 8/2018 | Takii | |
| 2018/0304936 A1 * | 10/2018 | Watabe | B60K 11/00 |
| 2019/0017232 A1 | 1/2019 | Zhao | |
| 2019/0047620 A1 | 2/2019 | Iwamura | |
| 2019/0161081 A1 | 5/2019 | Ogura | |
| 2019/0161131 A1 | 5/2019 | Barimani et al. | |

FOREIGN PATENT DOCUMENTS

| | | | | |
|---|---|---|---|---|
| EP | 3366898 A1 * | 8/2018 | | F01P 11/10 |
| FR | 2848914 A1 * | 6/2004 | | B60H 1/26 |
| GB | 501572 A * | 3/1939 | | B62D 25/082 |
| GB | 1017885 A * | 1/1966 | | B60K 11/04 |
| JP | 2002-173047 A | 6/2002 | | |
| JP | 2006-248491 A | 9/2006 | | |
| JP | 2011-126342 A | 6/2011 | | |
| JP | 2012-218510 A | 11/2012 | | |
| JP | 2013-129263 A | 7/2013 | | |
| JP | 2013-248964 A | 12/2013 | | |
| JP | 2020104653 A * | 7/2020 | | |
| WO | 2017022217 A1 | 2/2017 | | |

OTHER PUBLICATIONS

Ozawa et al. JP 2012-218510 A English Translation from ip.com (Year: 2012).
International Search Report dated Jul. 26, 2016 issued in corresponding PCT Application PCT/US2016/059062.

* cited by examiner

TRACTOR

CROSS REFERENCE TO RELATED APPLICATIONS

This application is a continuation from U.S. application Ser. No. 15/575,740 filed Nov. 20, 2017, which is a national stage application pursuant to 35 U.S.C. § 371 of International Application No. PCT/JP2016/059062 filed Mar. 22, 2016, which claims priority under 35 U.S.C. § 119 to JP Application No. 2015-104322 filed on May 22, 2015 and JP Application No. 2015-108012 filed on May 27, 2015. The disclosure of each of the listed applications is incorporated herein by reference in its entirety.

DESCRIPTION

Technical Field

The present invention relates to a structure of a tractor provided with a hot-wind blocking plate that separates an operation unit from a motor unit, the tractor configured such that a work machine is coupleable to the rear end thereof for use in agricultural works.

Background Art

Conventionally, a tractor is configured such that: a motor unit is mounted in a front portion of a machine body frame; an operation unit is provided at the rear thereof with a hot-wind blocking plate interposed therebetween; a PTO shaft protrudes at the rear end of a transmission case that extends from the motor unit along the machine body frame; and the tractor tows a work machine coupled to the rear end of a tractor main body while traveling with front and rear wheels that are provided to axles extending from front and rear axle cases disposed below the machine body frame, to perform agricultural works with power transmitted from the PTO shaft to the work machine (for example, see Patent Literature 1 (PTL 1)).

The hot-wind blocking plate disposed between the motor unit and the operation unit is configured not only to prevent a hot wind generated in an engine of the motor unit from flowing to the operation unit side but also to enable an operation unit component to be attached according to specifications.

PTL 1: Japanese Patent Application Laid-Open No. 2011-126342

Such a tractor conventionally requires that many types of complicated component parts applicable to different models be preliminarily prepared because there are an increased diversity of types depending on a region where it is used, a model such as cabin type or ROPS type, the size such as a large size or a small size, etc.

In view of such circumstances on site, commoditization of a component part, etc. among a diversity of models especially based on a difference between foreign specifications and domestic specifications, commoditization of a component part among tractors of different models, or the like, which is a tractor cost problem and a maintenance work problem, is an urgent and important need in a manufacturing site or a maintenance work site.

Particularly for the hot-wind blocking plate disposed between the motor unit and the operation unit, it is necessary to manufacture a hot-wind blocking plate dedicated for each model according to the presence or absence of a wiper which depends on a difference in model such as cabin type or ROPS type, and according to a difference in the hood shape which depends on the size of an engine, etc.

SUMMARY OF INVENTION

An object of the present invention is to provide a tractor in which a basic shape of a hot-wind blocking plate disposed between a motor unit and an operation unit is commonalized as a sharable element, and cutting of an outer edge portion of the hot-wind blocking plate enables application to various specifications including different sizes of motors and operation units, thus achieving convenience in assembling the tractor, enabling mass production by using the sharable element, enabling an efficient inventory storage, and providing an advantage in costs.

A first aspect of the invention includes: a hot-wind blocking plate disposed between a motor unit and an operation unit, the dimension of the hot-wind blocking plate being adjustable by cutting an outer edge portion of the blocking plate; and an operation unit component mounted in the outer edge portion of the hot-wind blocking plate, a position where the operation unit component is mounted is changeable depending on a specification of the operation unit.

In the first aspect of the invention, the hot-wind blocking plate may be disposed between the motor unit and the operation unit, the dimension of the hot-wind blocking plate being adjustable by cutting the outer edge portion of the blocking plate, and the operation unit component may be mounted in the outer edge portion of the hot-wind blocking plate, the position where the operation unit component is mounted is changeable depending on a specification of the operation unit. Accordingly, the hot-wind blocking plate can serve as a sharable element, and in addition most of operation unit components can also serve as sharable elements, thus enabling mass production of the hot-wind blocking plate and most of the operation unit components under the same standard, which leads to an efficient inventory storage and an advantage in costs.

Even for different specifications having different heights of the hood due to a difference in the size of a motor mounted, the vertical dimension can be adjusted by cutting the outer edge portion of the hot-wind blocking plate. Thus, the same hot-wind blocking plate can be shared among tractors of different specifications if the adjustment is made by cutting, which enables mass production under the same standard and also enables esthetic appearance to be satisfied because a large change of external appearance is not caused.

Since the cutting of the outer edge portion of the hot-wind blocking plate can be implemented with a cutting die or the like, processing into a hot-wind blocking plate adapted for another specification is easy. This is advantageous in manufacturing costs as compared to separately manufacturing a special hot-wind blocking plate adapted for a specification.

In a second aspect of the invention which is according to the first aspect, the height of the hot-wind blocking plate may be adjustable by cutting, of the outer edge portion of the blocking plate, an upper end edge portion, and a dashboard serving as an operation unit component may be mounted in the upper end edge portion of the hot-wind blocking plate in such a manner that the height position of the dashboard is freely adjustable.

In the second aspect of the invention, the height of the hot-wind blocking plate may be adjustable by cutting the upper end edge portion of the outer edge portion of the blocking plate, and the dashboard serving as the operation unit component may be mounted in the upper end edge portion of the hot-wind blocking plate in such a manner than the height position of the dashboard is freely adjustable. Accordingly, many members necessary for the dashboard can be commonly used as sharable elements for specifications of different heights, thus enabling mass production under the same standard, enabling an efficient inventory storage, and providing an advantage in costs.

In a third aspect of the invention which is according to the first or second aspect, the outer edge portion of the hot-wind blocking plate before being cut may be provided with an attaching hole for attachment of a wiper, and in a cabin type which requires a wiper, the outer edge portion of the hot-wind blocking plate may not be cut, while in a ROPS type which requires no wiper, the outer edge portion of the hot-wind blocking plate may be cut, such that dual use in both of the types can be enabled.

In the third aspect of the invention, the upper end edge portion of the hot-wind blocking plate before being cut may be provided with the attaching hole for attachment of a wiper, and whether or not to cut the upper end edge portion of the hot-wind blocking plate may be selected depending on whether the type is the cabin type which requires a wiper or the ROPS type which requires no wiper. Adapting the cutting to a standard enables dual use of the hot-wind blocking plate of the same standard. Particularly in the ROPS type, merely cutting the hot-wind blocking plate can ensure a good field of view in driving with suppression of the height of the hot-wind blocking plate, while if no cutting is made, the hot-wind blocking plate can be used with a wiper attached thereto in the cabin type. Thus, mass production under the same standard is enabled from the beginning of the manufacture of the hot-wind blocking plate. Due to the same standard products, an inventory storage can be efficiently made, and an advantage in costs increases accordingly.

In a fourth aspect of the invention which is according to any one of the first to third aspects, a heat exhaust cover having a heat exhaust hole may be disposed in a gap between the hot-wind blocking plate and a hood that covers the motor unit.

In the fourth aspect of the invention, the heat exhaust cover having the heat exhaust hole may be disposed in the gap between the operation unit and the hood that covers the motor unit. This enables heat generated in the motor unit to be reliably discharged into atmosphere through the heat exhaust hole of the heat exhaust cover. In addition, even when rain water or car-washing water enters through the heat exhaust hole, the rain water or the like can flow out (be discharged) to the outside at a location behind the motor unit, because the heat exhaust cover is arranged behind the hood that covers the motor unit. Accordingly, even when a diesel particulate filter (DPF) which generates heat is arranged in the motor unit, it is easy to arrange the DPF in a position where rain water or the like does not drop through the heat exhaust hole. Thus, it can be avoided that the rain water or the like contacts the DPF to be vaporized and diffused. The heat exhaust cover is able to cover the gap formed between the hood and the operation unit. Thus, downsizing of the hood and improvement in esthetic appearance of a work vehicle can be obtained simultaneously.

In a fifth aspect of the invention which is according to the fourth aspect, the heat exhaust hole may be an elongated hole extending in a front-rear direction with a front end thereof directed inward and a rear end thereof directed outward, the heat exhaust hole having a heat exhaust guide piece that protrudes in a rear end edge portion of the heat exhaust hole, and exhaust heat flowing out of the motor unit through the heat exhaust hole may be guided laterally outward by the heat exhaust guide piece.

In the fifth aspect of the invention, exhaust heat flowing out of the motor unit through the heat exhaust hole may be guided laterally outward by the heat exhaust guide piece, which can prevent an operator operating the operation unit from being directly exposed to the exhaust heat moving outward toward the rear. Accordingly, dwelling comfort of the operator can be ensured well even though the operation unit is not covered with a cabin.

In a sixth aspect of the invention which is according to the fourth or fifth aspect, the heat exhaust cover may include a cover front portion that covers a pivotal support portion from its upper side, and a cover rear portion that covers the pivotal support portion from its rear side, and the cover rear portion may form a recess extending in a left-right direction, and the cover rear portion may have a heat exhaust hole that is an elongated hole extending in the left-right direction.

In the sixth aspect of the invention, the cover rear portion of the heat exhaust cover may form a recess extending in the left-right direction. Thus, even when the operation unit is covered with the cabin, it can be avoided that the cover rear portion interferes with a base of a front wiper attached to the cabin, a jet portion of a front glass washer, or the like. Since the cover rear portion has the heat exhaust hole which is an elongated hole extending in the left-right direction, the exhaust heat discharged through the heat exhaust hole serves as a defroster when it is contacted by a front glass of the cabin. As a result, efficient use of the exhaust heat can be obtained.

The present invention can provide a tractor in which a basic shape of a hot-wind blocking plate disposed between a motor unit and an operation unit is commonalized as a sharable element, and cutting of an outer edge portion of the hot-wind blocking plate enables application to various specifications including different sizes of motors and operation units, thus achieving convenience in assembling the tractor, enabling mass production by using the sharable element, enabling an efficient inventory storage, and providing an advantage in costs.

DESCRIPTION OF EMBODIMENTS

In the following, an embodiment of the present invention will be described with reference to the drawings, taking a tractor as an example of a work vehicle.

As for the terms front, rear, left, and right in the descriptions herein, the front side and the rear side of a tractor when seen from a driver seated on a driver seat are defined as front and rear, respectively, and the right side and the left side when seen from the driver are defined as right and left, respectively.

A tractor according to one embodiment of the present invention includes: a hot-wind blocking plate disposed between a motor unit and an operation unit, the dimension of the hot-wind blocking plate being adjustable by cutting an outer edge portion of the blocking plate; and an operation unit component mounted in the outer edge portion of the hot-wind blocking plate, a position where the operation unit component is mounted is changeable depending on a specification of the operation unit.

As shown in FIG. 1 to FIG. 4 and FIG. 19 to FIG. 22, a tractor A1, A2 includes: a machine body frame 1 made of elongated steel plates having a fixed width and extending in a front-rear direction, the elongated steel plates standing with the width thereof extending in a vertical direction, the elongated steel plates being arranged left and right; a motor unit 2 mounted in a front portion relative to the machine body frame 1; an operation unit 3 arranged at the rear thereof; and front and rear wheels FT, RT arranged below the machine body frame 1, to which power is transmitted from an engine E through a transmission case M.

The transmission case M, which is integrally fixed to the machine body frame 1, has a PTO shaft (not shown) protruding at the rear end thereof, and is configured to transmit power to various work machines which can be coupled to a rear portion of the tractor A1, A2 through a coupler, a lifter, etc. (not shown).

Figure 1:
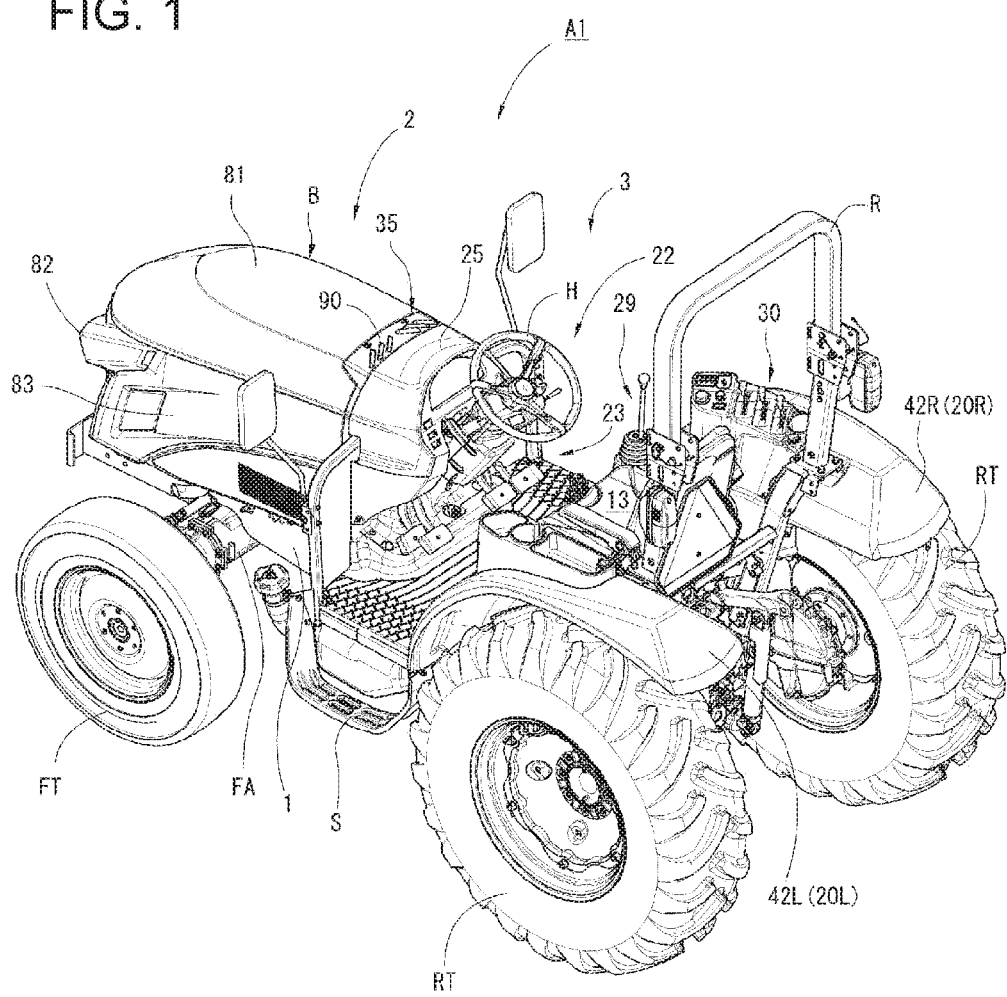
FIG. 1 is a perspective view of a ROPS type tractor according to an embodiment.

Referring to FIG. 1, the tractor constitutes a ROPS type tractor A1 which is one form of a work vehicle having a ROPS R standing behind an operation unit 3. A tractor shown in FIG. 19 constitutes a cabin type tractor A2 having a cabin C that covers an operation unit 3.

An entire configuration of the ROPS type tractor A1 will firstly be described, then an entire configuration of the cabin type tractor A2 will be described, and then a configuration of a hot-wind blocking plate 100, 200 which is a feature of the present invention will be described.

Description of Entire Configuration of ROPS Type Tractor

As shown in FIG. 1 to FIG. 4, the ROPS type tractor A1 includes: a machine body frame 1 that extends in the front-rear direction to form a framework; a motor unit 2 provided in a front portion of the machine body frame 1; and a transmission case M provided in a rear end portion of the machine body frame 1, the motor unit 2 and the transmission case M being interlockingly coupled to each other via a power transmission shaft (not shown).

A front axle case FA whose axis line is in the left-right direction is attached to a front portion of the machine body frame 1, and front wheels FT, FT are attached to left and right side end portions of the front axle case FA through a front wheel shaft (not shown).

Rear axle cases RA, RA are attached to left and right side portions of the transmission case M, respectively, and each of rear wheels RT, RT is interlockingly coupled to each of the rear axle cases RA, RA through a rear wheel shaft 4. The transmission case M and the front axle case FA are interlockingly coupled to each other through a front wheel drive shaft (not shown), to enable four-wheel drive in which the front and rear wheels FT, RT are driven.

Figure 4:
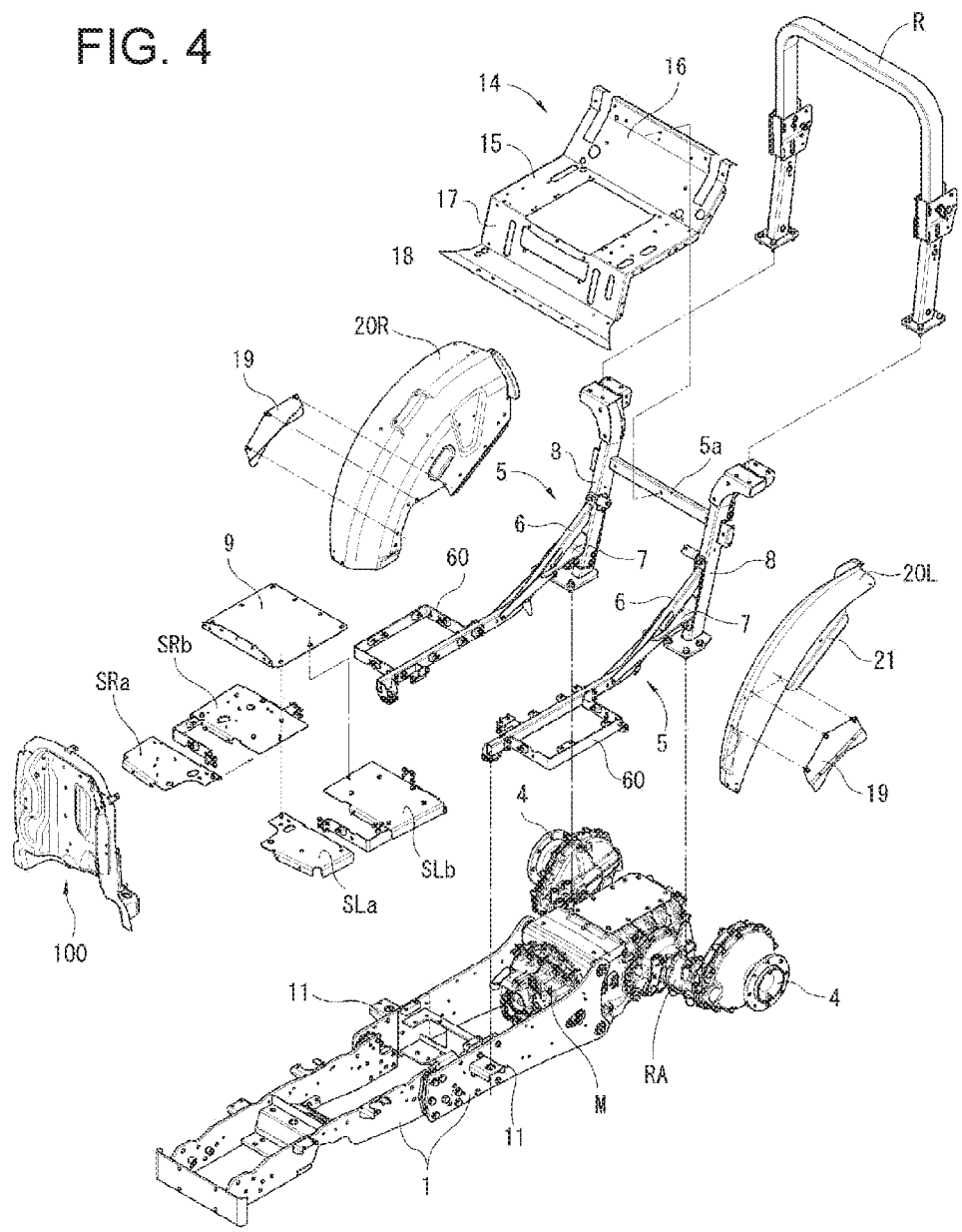
FIG. 4 is an exploded perspective view showing the vicinity of the machine body frame of the ROPS type according to the embodiment.
Figure 5:
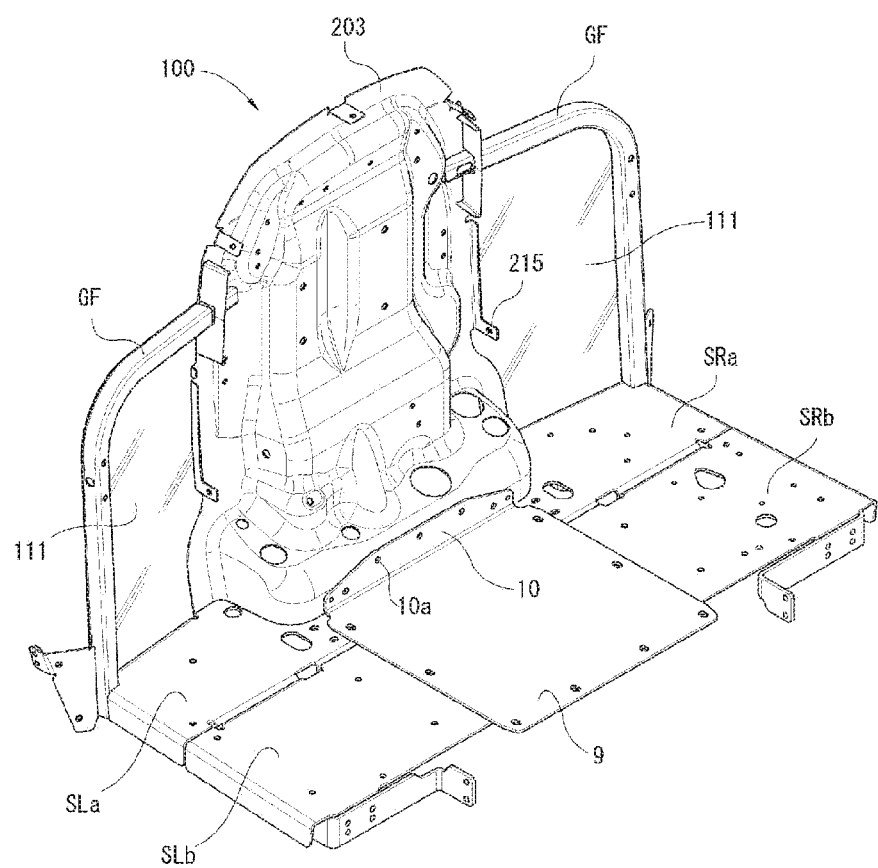
FIG. 5 is a perspective view showing the vicinity of a hot-wind blocking plate of the ROPS type according to the embodiment.

The tractor A1 has an operation unit 3 arranged at the rear of the motor unit 2 on the machine body frame 1. More specifically, as shown in FIG. 4 and FIG. 5, the operation unit 3 is placed on and fixed to left and right base frames 5, 5 that are attached to left and right lateral portions of the machine body frame 1. The left and right base frames 5, 5 are coupled by a coupling frame 5a that extends in the left-right direction. Each of the base frames 5 forms an incline frame 6 that is bent upward toward the rear, and at a rear end portion thereof, an auxiliary beam 8 is integrally provided so as to stand vertically with interposition of a horizontal coupling plate 7 which is provided in association with the rear axle case RA. In a front portion of each base frame 5, a floor frame body 60 having a C-like shape in a plan view for supporting an operation unit floor 9 from the lower side is provided so as to bridge over the outer side of the base frame 5.

A front end of each base frame 5 is placed on and fixed to an operation unit placement piece 11 with interposition of a vibration and sound absorbing plate 12, the operation unit placement piece 11 protruding sideways from the machine body frame 1. A rear end of each base frame 5 has the auxiliary beam 8 attached thereto, with a lower end portion of the auxiliary beam 8 being placed on and fixed to each of the left and right rear axle cases RA.

The operation unit 3 has the operation unit floor 9 serving as a floor surface part and extending over each base frame 5 from a position directly at the rear of the motor unit 2 to a position directly in front of the transmission case M. Left and right halved steps SLa, SLb, SRa, SRb are arranged on the floor frame body 60 and on the left and right lateral sides of the operation unit floor 9. A structure of the left and right halved steps SLa, SLb, SRa, SRb is equivalent to extension of a surface of the operation unit floor 9.

A driver seat frame 14 for constituting a driver seat 13 is placed on and coupled to the incline frames 6 of the base frames 5. The driver seat frame 14 includes: a horizontal seat frame 15; a backrest frame 16 that extends obliquely upward from a rear edge portion of the seat frame 15; a front frame 17 that hangs downward from the front end of the seat frame 15; and a dust proof plate 18 that extends frontward from the lower end of the front frame 17. The dust proof plate 18 is, by being coupled to a rear end edge portion of the operation unit floor 9, able to close the lower side of the front end of the driver seat frame 14, thus preventing dust and dirt, which stirs up from a ground surface into a space below the driver seat 13, from entering the operation unit 3.

Outer side surfaces of the backrest frame 16 are in tight contact with abutment plates 19 and fixed with a bolt, the abutment plates 19 having substantially triangular shapes and arranged so as to extend upward together with and in abutment with the outer side surfaces of the incline frames 6. In addition, a fender interior wall portion 21 of a fender 20 for covering the inside of the rear wheel RT is interposed between the seat frame 15 and the abutment plate 19 that extends upward from the incline frame 6 of each of the left and right base frames 5, so that the fender interior wall portion 21 is sandwiched between the seat frame 15 and the abutment plate 19, while these three members are integrally and tightly coupled to one another with bolts.

Figure 6:
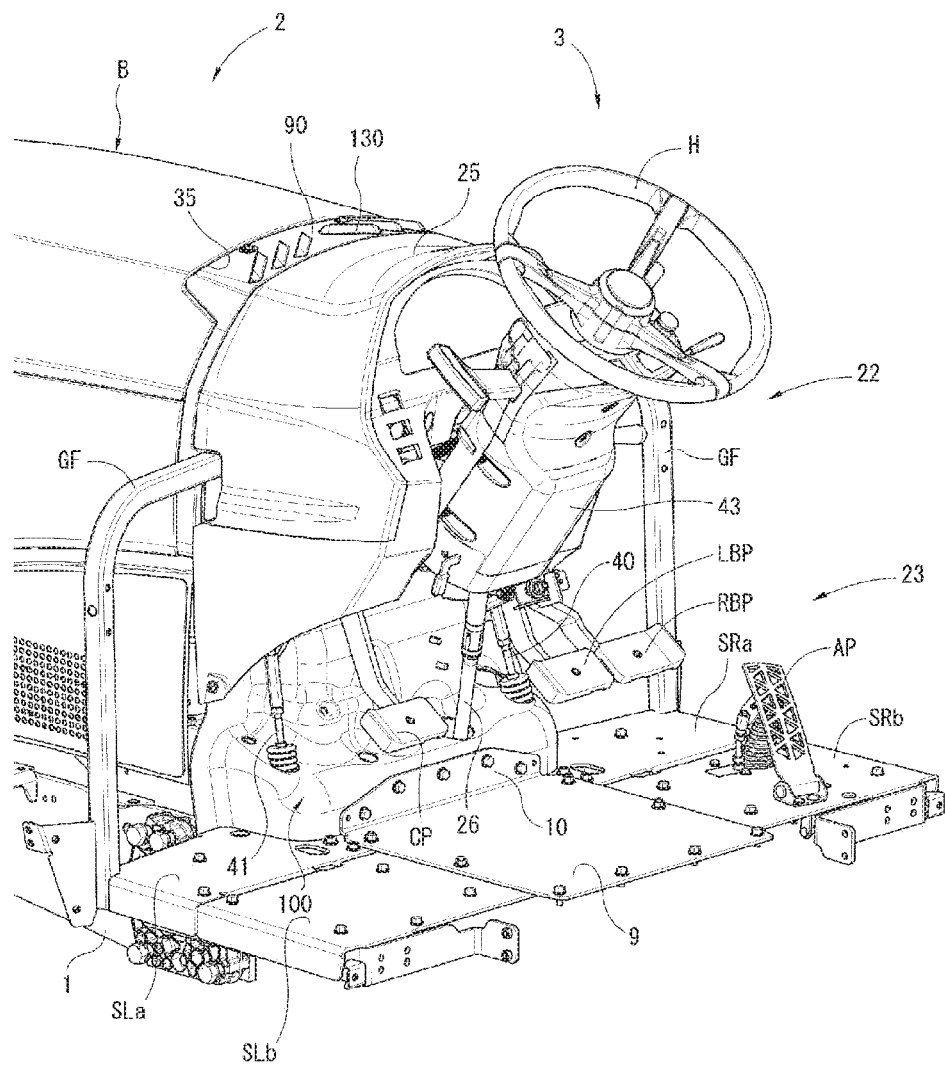
FIG. 6 is a perspective view showing a part of an operation unit of the ROPS type according to the embodiment.
Figure 7:
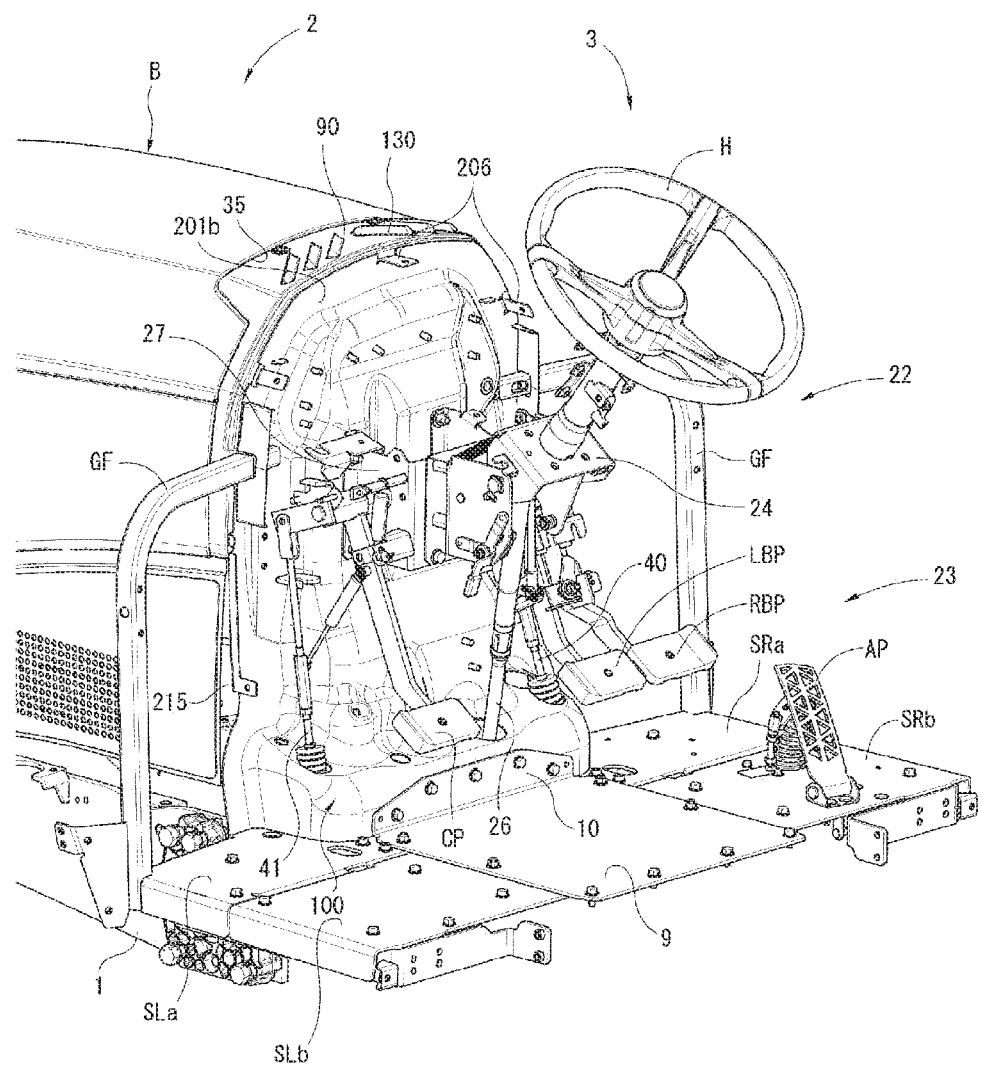
FIG. 7 is a perspective view showing a part of the operation unit of the ROPS type according to the embodiment.

In a front end edge portion of the operation unit floor 9, a hot-wind blocking plate 100 for separating the motor unit 2 and the operation unit 3 from each other is provided so as to stand. As shown in FIG. 5 to FIG. 7, windbreak plates 111, 111 arranged adjacent to and in connection with left and right lateral portions of the hot-wind blocking plate 100. On the operation unit 3 side of the hot-wind blocking plate 100, a coupling case 27 protrudes, and in addition, a steering wheel H is provided on a steering column 24 with interposition of a steering wheel spindle 26, the steering column 24 being freely tiltably mounted on a steering bracket 28 fixed to the coupling case 27.

In front of and above the steering column 24, a dashboard 25 is attached to the upper end edge of the hot-wind blocking plate 100, and a steering cover 43 covers a steering mechanism 22 except the steering wheel H.

Various operation pedals 23, which are supported on the coupling case 27 which protrudes on the hot-wind blocking plate 100, include a clutch pedal CP, a left brake pedal LBP, and a right brake pedal RBP arranged in this order from the left. An acceleration pedal AP is provided so as to protrude on the right step SRb which constitutes a floor surface.

Above the transmission case M located at the rear of an engine E of the motor unit 2, the driver seat 13 is arranged, and a pair of left and right fenders 20L, 20R are arranged on the left and right lateral sides of the driver seat 13, as shown in FIG. 1. The pair of left and right fenders 20L, 20R extend upward from left and right lateral rear portions of the operation unit floor 9, to cover upper front portions of the rear wheels RT, RT. The pair of fenders 20L, 20R are provided with outer fenders 42L, 42R that cover outer edge portions of the fenders 20L, 20R and that extend further outward.

On and around the fender 20R located on the right lateral side of the operation unit 3, manipulation levers and switches are arranged including a speed change operation part 29 for controlling the vehicle speed, a loader operation part 30 for lifting a work machine, and the like, as shown in FIG. 1.

The ROPS R, which has an inverted U shape, is provided in a bridging manner so as to stand on the upper ends of the auxiliary beams 8 that stand on upper surfaces of the left and right rear axle cases RA, RA. The ROPS R serves a function of protecting a driver seated on the driver seat 13 in case of overturn of the machine body.

Figure 2:
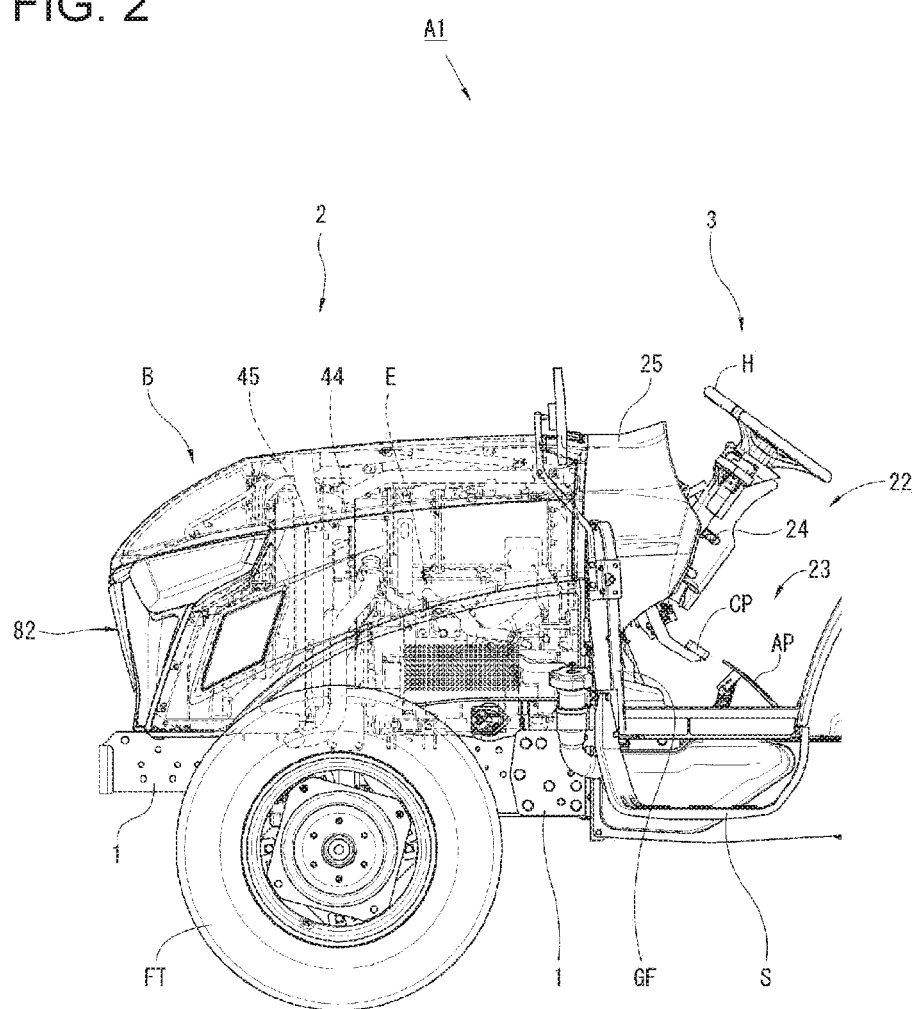
FIG. 2 is a lateral transparent view of the ROPS type tractor according to the embodiment.

As shown in FIG. 2, the motor unit 2 includes the engine E and the like arranged in the front portion of the machine body frame 1, and a cooling fan 44 and a radiator 45 are provided so as to stand directly in front of the engine E.

The motor unit 2 having the above-described configuration is provided with a hood support frame body (not shown), and a hood B is attached to the hood support frame body in a freely openable and closable manner. The hood B is able to close and open an engine room of the motor unit 2.

The hood B has a box-like shape with its lower and rear sides opened, defined by a ceiling surface portion 81, a reticulated front grille 82, and left and right side surface portions 83, 83. The ceiling surface portion 81 is in the shape of an inverted bilge (so-called bilge-shaped ceiling).

Figure 8:
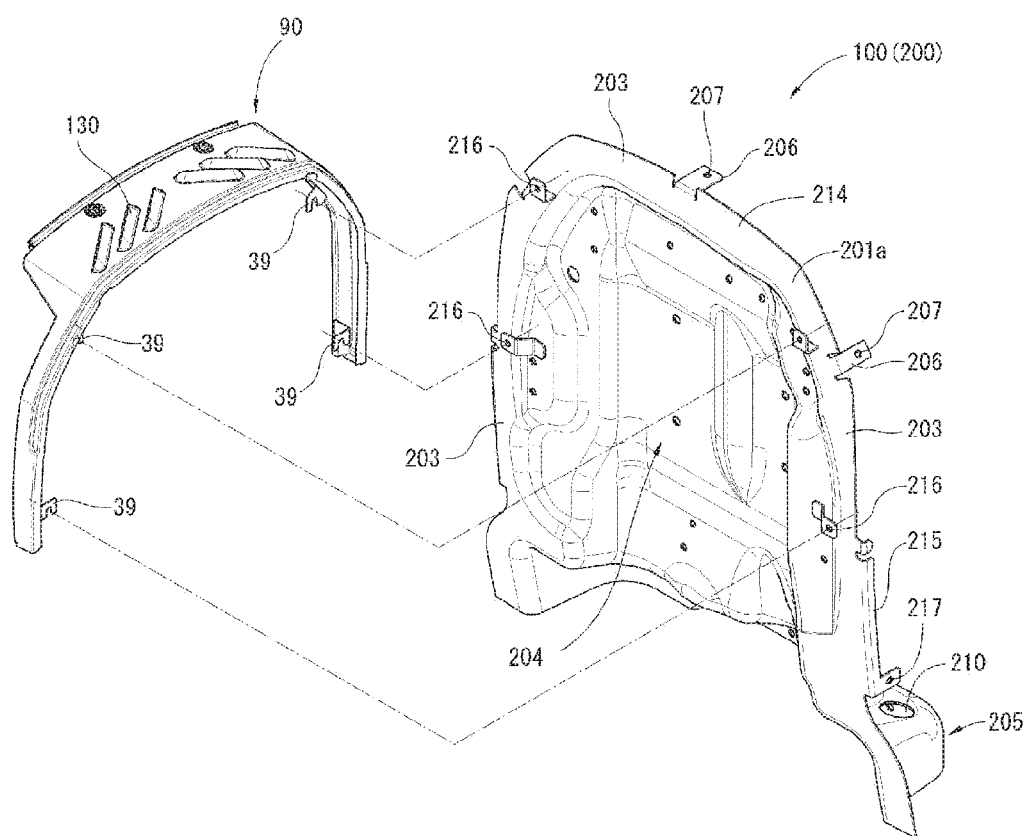
FIG. 8 is an exploded perspective view showing how to couple the hot-wind blocking plate to a heat exhaust cover.
Figure 9:
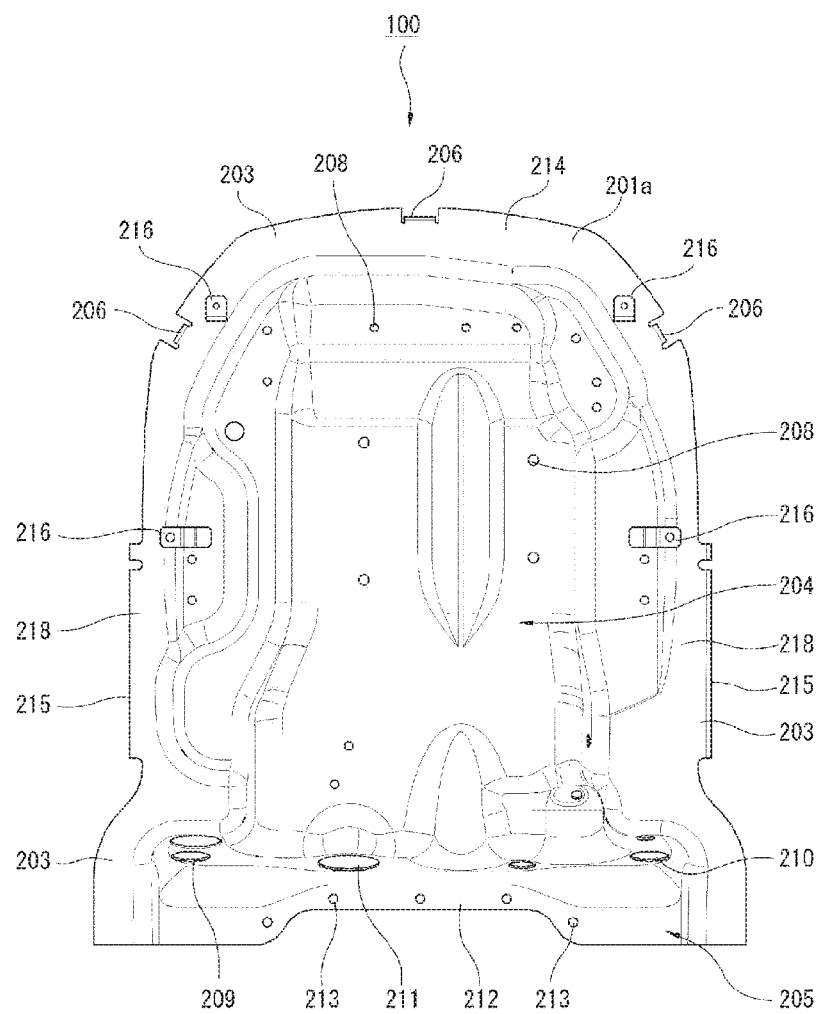
FIG. 9 is a front elevational view (motor unit side) of the hot-wind blocking plate of the ROPS type according to the embodiment.

In a gap 88 formed between the hood B that covers the motor unit 2 having the above-described configuration and the operation unit 3, a heat exhaust cover 90 is disposed which has heat exhaust holes 130 as shown in FIG. 6 to FIG. 8. The heat exhaust cover 90, which has an inverted U shape in a rear elevational view similarly to the shape of a rear end edge portion of the hood B, is connected to an upper portion of the hot-wind blocking plate 100.

An entire configuration of the cabin type tractor A2 will now be described. As for configurations common to the ROPS type, descriptions will be omitted as appropriate.

Description of Entire Configuration of Cabin Type Tractor

A basic configuration of the cabin type tractor A2 is the same as that of the ROPS type tractor A1 described above. As shown in FIG. 19 to FIG. 22, a motor unit 2 is provided in a front portion of a machine body frame 1; a transmission case M is provided in a rear end portion of the machine body frame 1, the motor unit 2 and the transmission case M being interlockingly coupled to each other via a power transmission shaft (not shown); and front and rear wheels FT, RT are arranged on axis lines of the front axle case FA and the rear axle case RA with respect to the left-right direction, to enable four-wheel drive. A configuration in which an operation unit 3 is placed on and fixed to left and right base frames 5' is also the same point.

A different point of the cabin type tractor A2 is that a cabin C for covering the operation unit 3 is provided instead of the ROPS R and the windbreak plates 111, 111.

Figure 22:
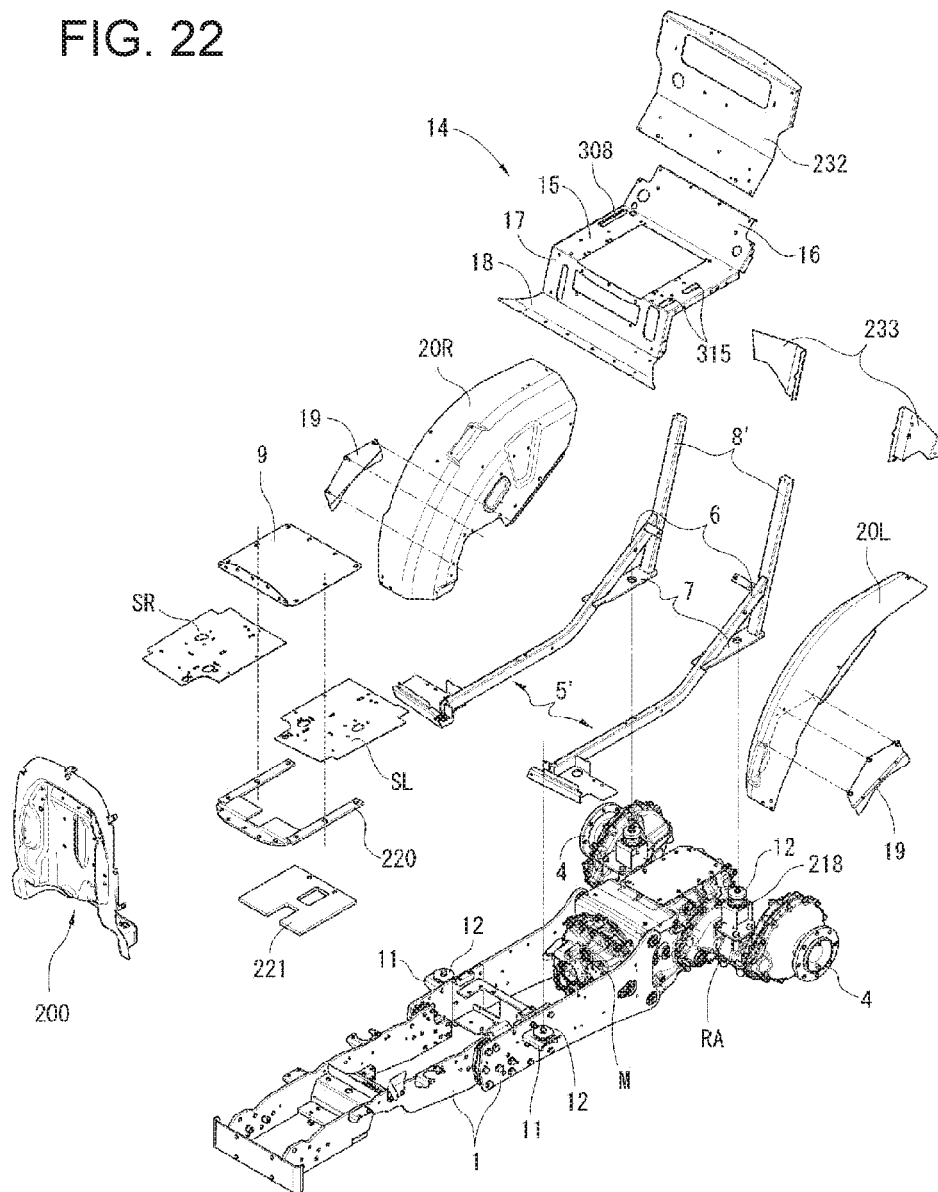
FIG. 22 is an exploded perspective view showing the vicinity of the machine body frame of the cabin type according to the embodiment.

Since the cabin C is provided, no floor frame body 60 for enhancing the strength of a floor surface of the operation unit 3 is formed on the left and right base frames 5', 5'. As shown in FIG. 22, a floor placement plate 220 having an inverted U shape in a plan view and a floor reinforcing plate 221 having a rectangular shape in a plan view are disposed between the left and right base frames 5', on which left and right steps SL, SR each configured as a single piece are placed and fixed. Above them, an operation unit floor 9 is disposed in an overlapping manner.

As shown in FIG. 1, FIG. 23, FIG. 24, and FIG. 27, the cabin C includes a cabin frame 222 having a hexahedral framework, and surface portions 223, 225, 231, 236 each formed of each piece constituting the cabin frame 222.

The cabin frame 222 includes a ceiling portion 224 in the shape of a flat box, arranged in a cab ceiling surface portion 223; a front glass portion 226 arranged in an upper portion of a front surface portion 225; and left and right side front wall portions 227 arranged in a lower portion of the front surface portion 225. In a middle of the lower portion, a hot-wind blocking plate 200 constitutes a part of the front surface portion 225 of the cabin C. Thus, the front surface portion 225 is constituted of the hot-wind blocking plate 200, the left and right side front wall portions 227 arranged to the left and right of the hot-wind blocking plate 200, and the front glass portion 226 arranged above the hot-wind blocking plate 200.

A wiper hole 230 through which a wiper shaft portion 229 is insertable is formed in a middle portion of the lower edge of the front glass portion 226. In an outer edge portion 203 of the hot-wind blocking plate 200, a wiper shaft hole 202 is formed in a substantially middle portion of an upper end edge portion 214, such that the wiper hole 230 of the front glass portion 226 and the wiper shaft hole 202 of the hot-wind blocking plate 200 are in communication with each other.

Figure 20:
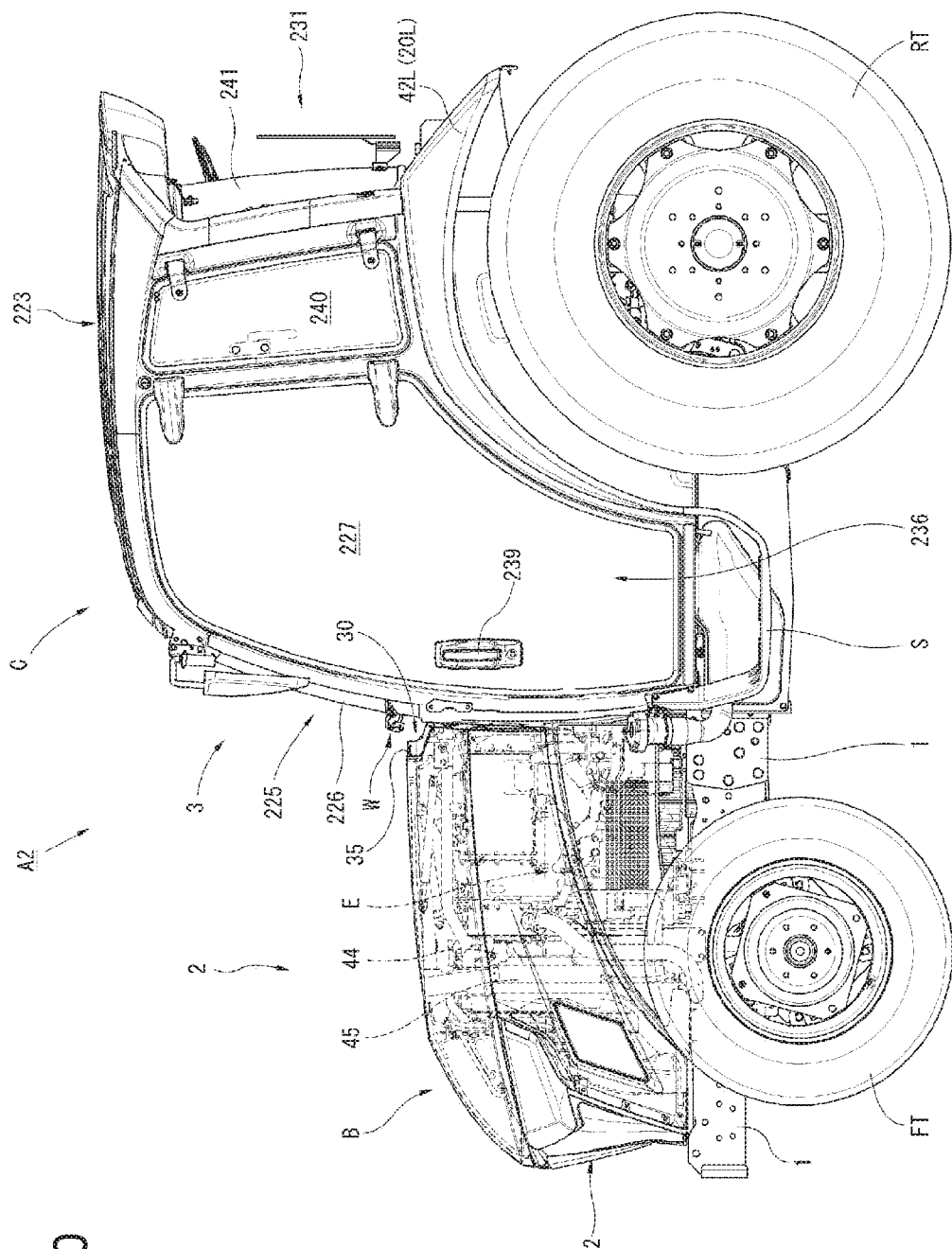
FIG. 20 is a lateral transparent view of the cabin type tractor according to the embodiment.
Figure 21:
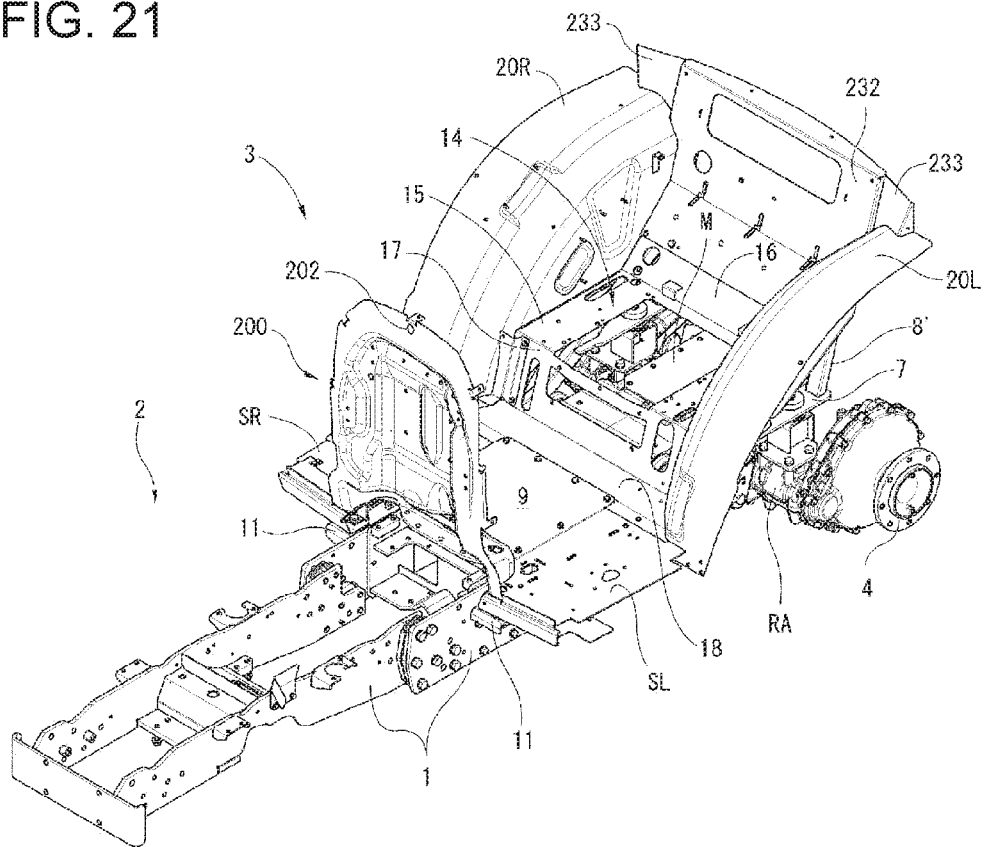
FIG. 21 is a perspective view showing the vicinity of a machine body frame of the cabin type according to the embodiment.

To be specific, the middle portion of the lower edge of the front glass portion 226 is arranged along an upper edge portion 201a of the hot-wind blocking plate 200 on the motor unit 2 side; as shown in FIG. 20, a wiper mechanism W that forms a base of a wiper portion 228 is provided in a substantially middle of an upper edge portion 201b of the hot-wind blocking plate 200 on the operation unit 3 side; and the wiper shaft portion 229 protruding from the wiper mechanism W toward the motor unit 2 is inserted in the wiper shaft hole 202 and the wiper hole 230, so that the wiper shaft portion 229 protrudes over a front surface of the front glass portion 226.

Figure 19:
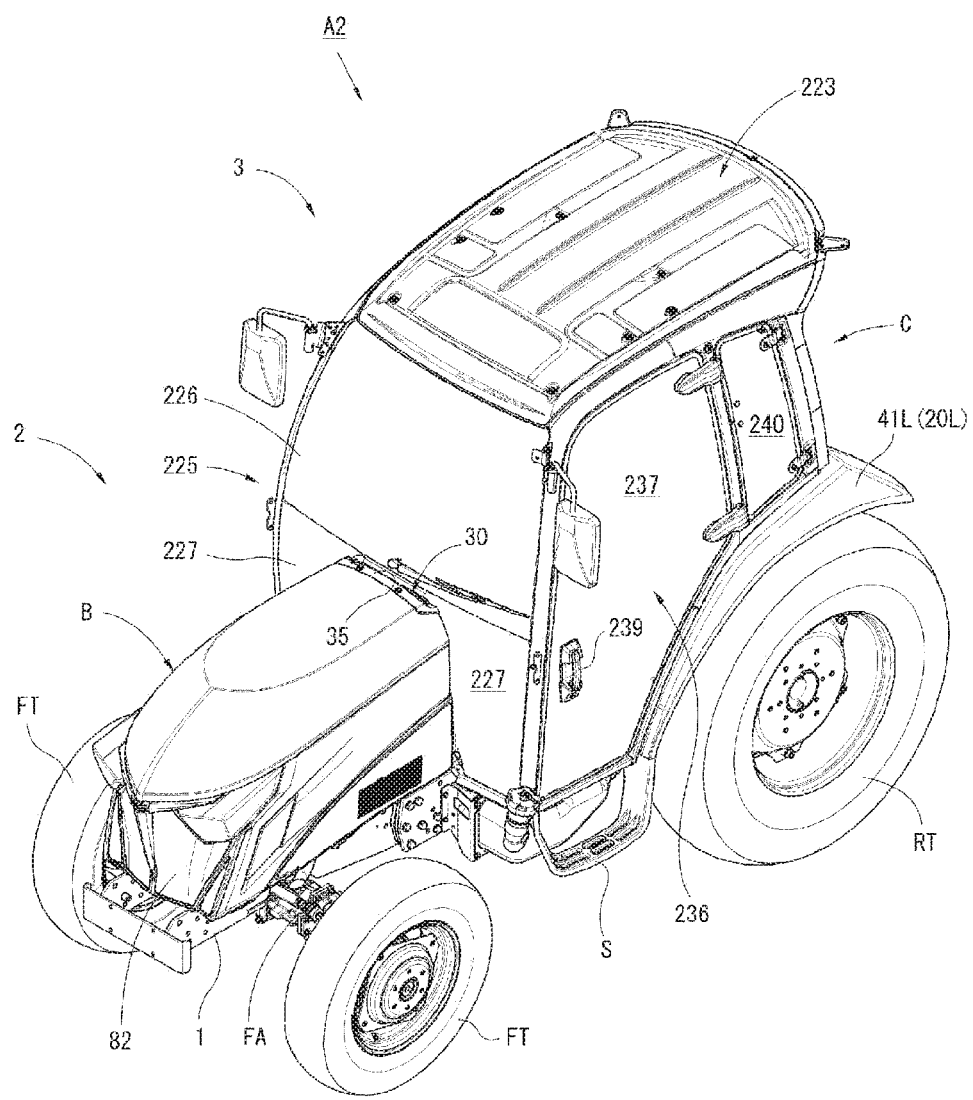
FIG. 19 is a perspective view of a cabin type tractor according to the embodiment.

The wiper portion 228, which is operable to ensure a driver's view by removing rain, snow, dirt, etc. attached to the front glass portion 226, is connected to an end portion of the wiper shaft portion 229 and arranged below and in abutment with the front surface of the front glass portion 226, as shown in FIG. 19. The hot-wind blocking plate 200 is fixed in the same manner as in the ROPS type tractor A1 described above.

Figure 23:
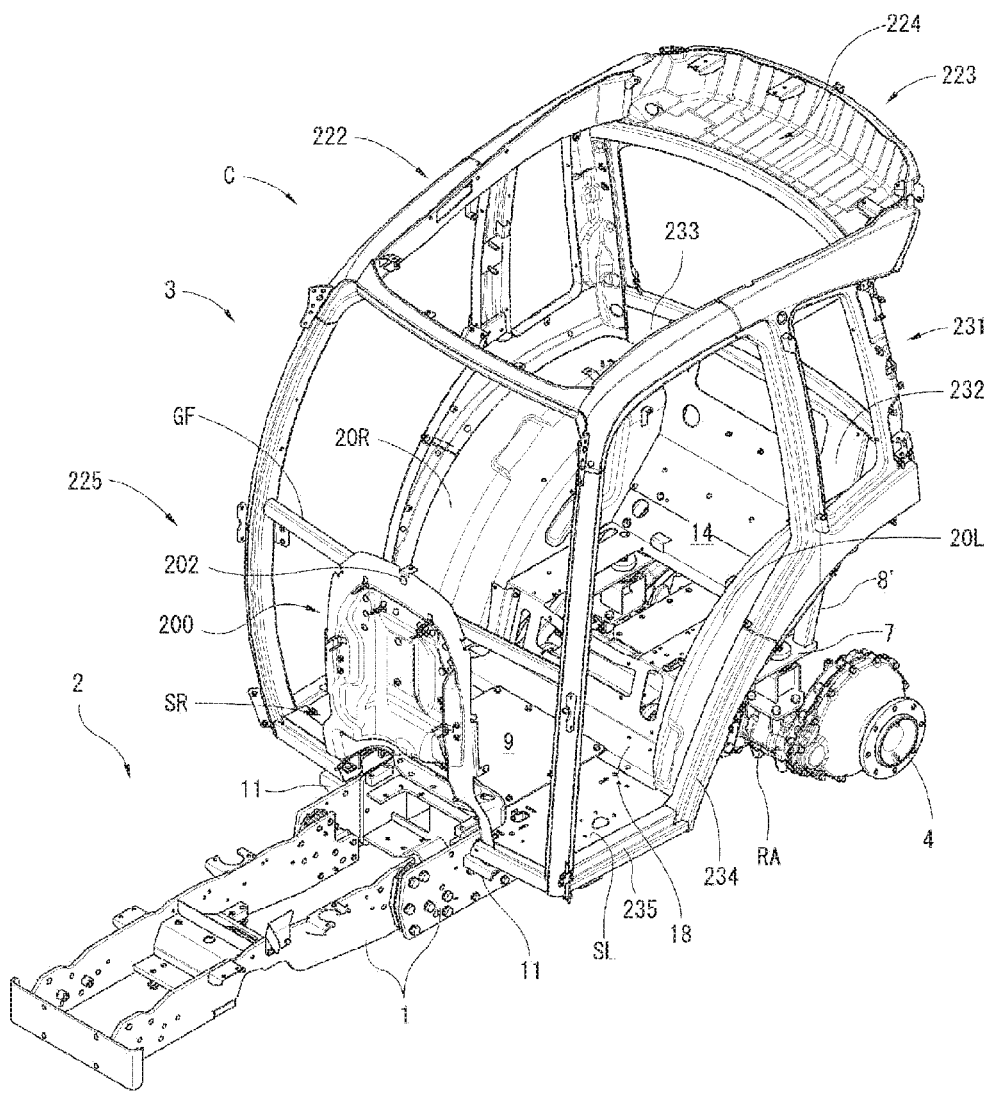
FIG. 23 is a perspective view showing a cabin and the vicinity of the machine body frame of the cabin type according to the embodiment.
Figure 24:
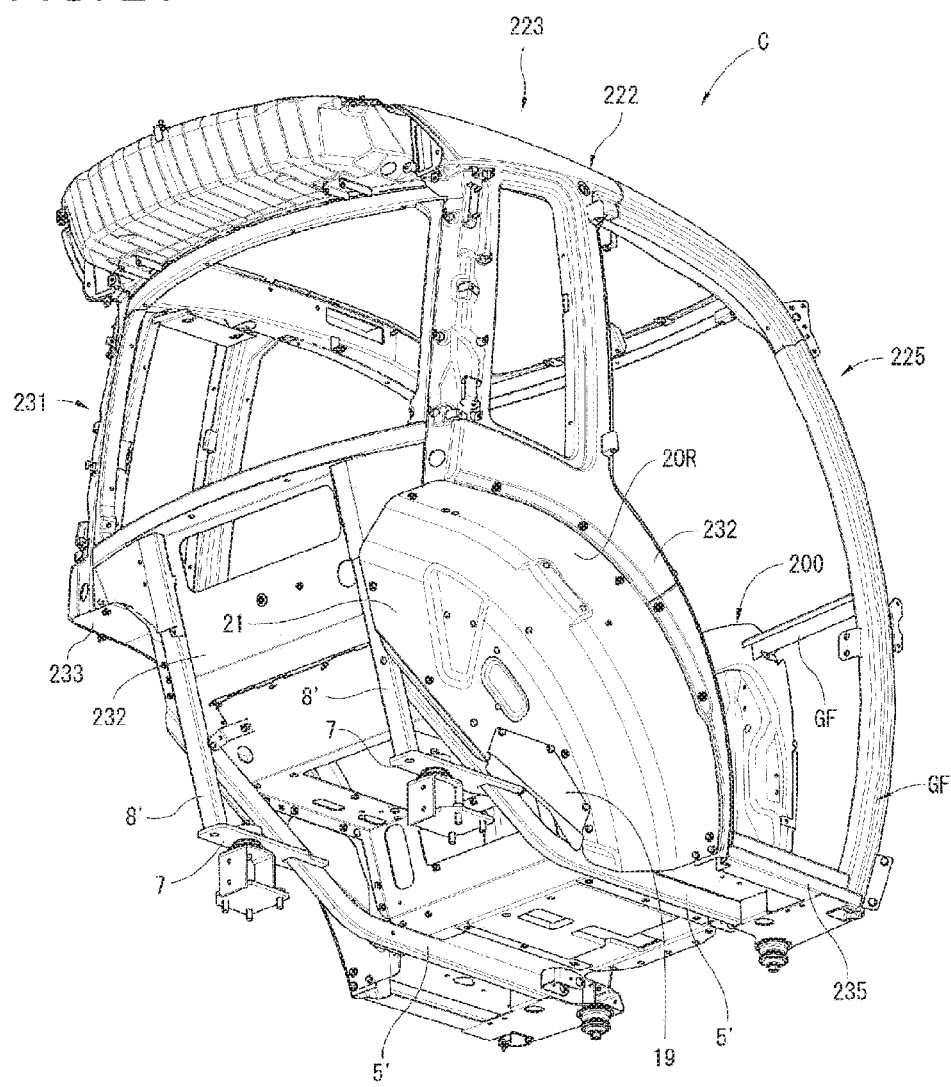
FIG. 24 is a rear perspective view of the cabin of the cabin type according to the embodiment.
Figure 26:
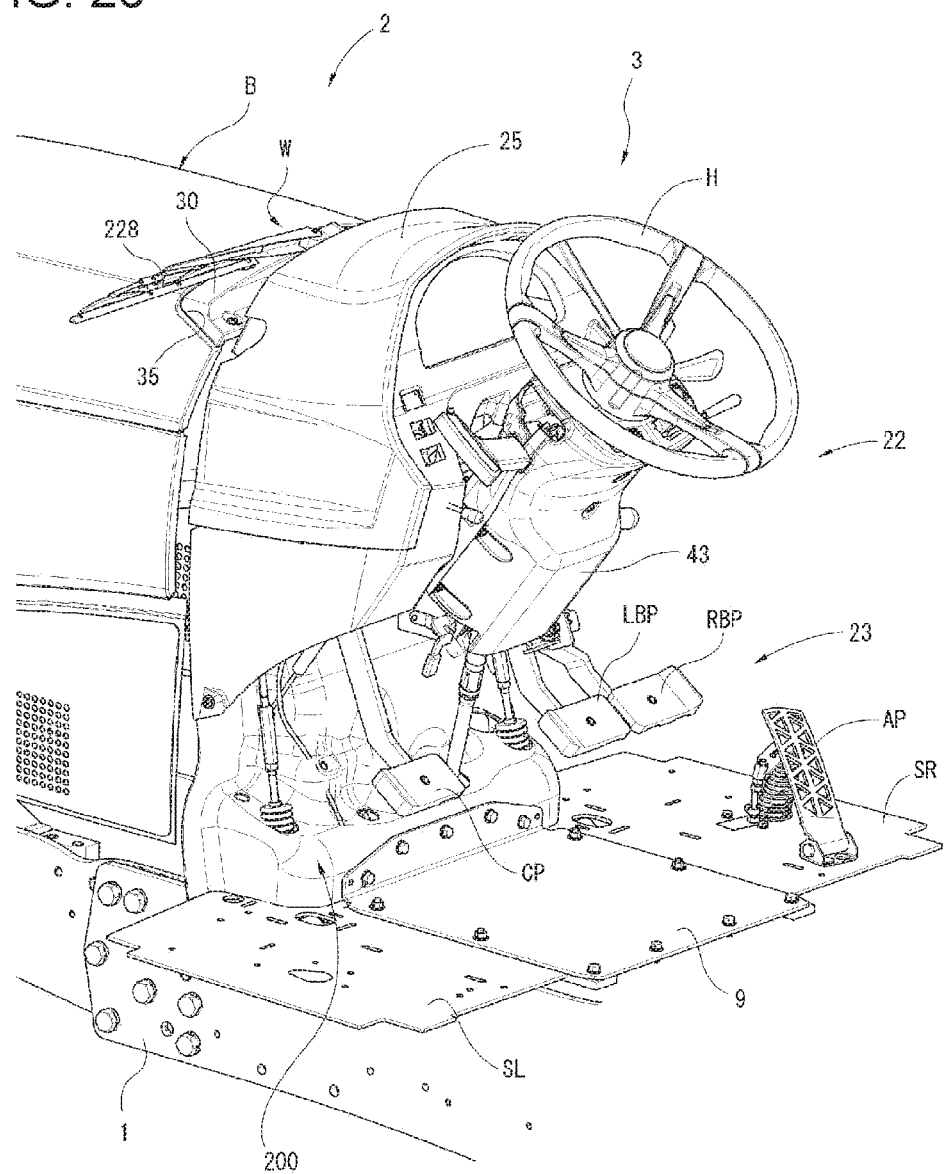
FIG. 26 is a perspective view showing a part of an operation unit of the cabin type according to the embodiment.
Figure 27:
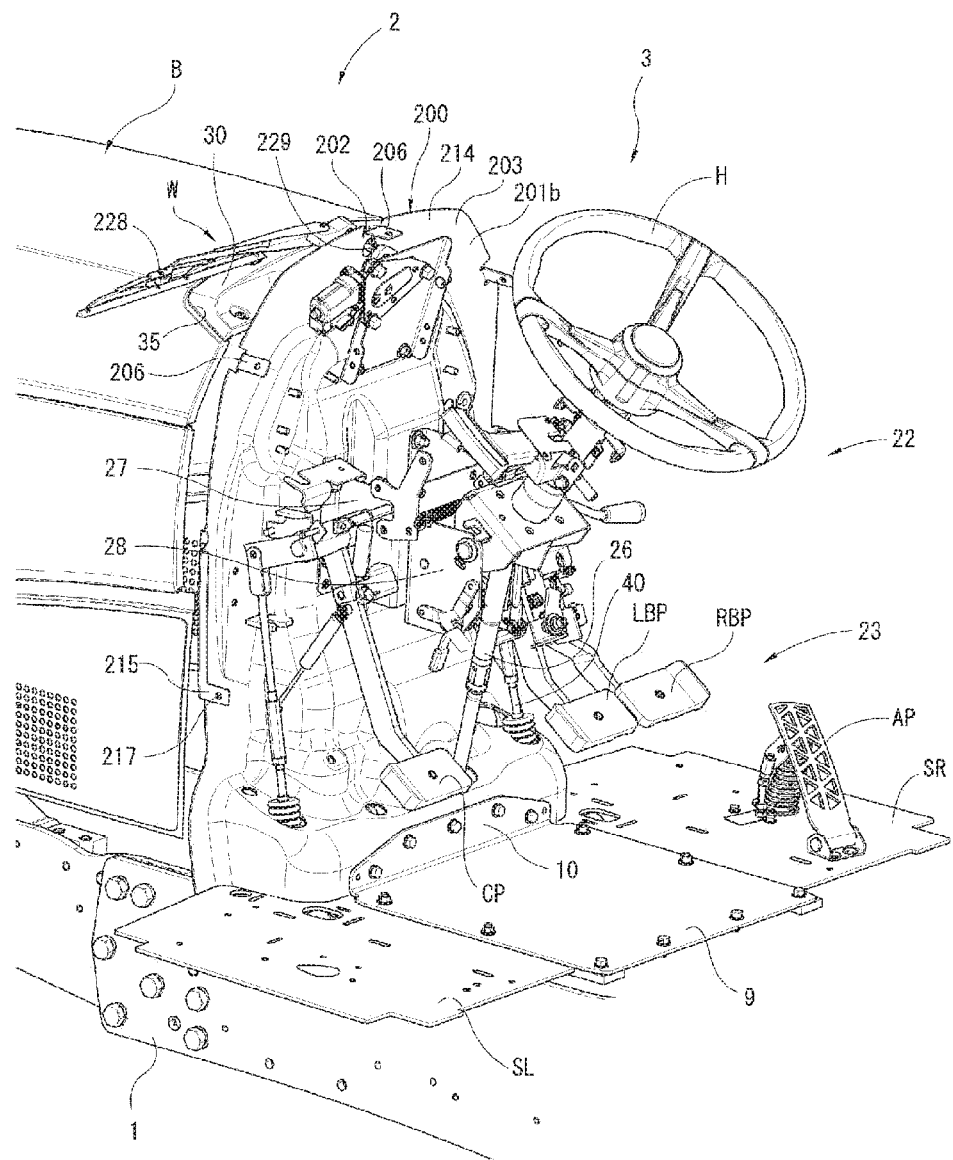
FIG. 27 is a perspective view showing a part of the operation unit of the cabin type according to the embodiment.

As shown in FIG. 22, FIG. 23, and FIG. 26, a rear surface portion 231 is integrally connected to the upper ends of the auxiliary beams 8', the rear ends of the fenders 20, and the lower rear end of the cabin frame 222 with interposition of a coupling bracket 233. A rear lateral frame 232 provided in a middle section of a rear surface of the cabin frame 222 is integrally coupled to the backrest frame 16 of the driver seat frame 14 with a bolt.

In addition, a lower end edge portion of a front portion of the cabin frame 222, that is, a lower horizontal frame 235 arranged in front of a semi-arc frame 234 placed on the fender 20, is integrally formed in abutment with an outer edge portion of a step S, as shown in FIG. 19 and FIG. 20.

In front portions of the left and right side surface portions 236, a pair of left and right platform door parts 237, 237 are arranged in a freely openable and closable manner. In FIG. 19, the reference sign 239 indicates an open/close grip provided on the outer side of the platform door part 237. Inside the platform door part 237, a grip pipe (not shown) is provided.

A pair of left and right side window portions 240 are arranged at the rear of the left and right side surface portions 236 in a freely openable and closable manner. In the rear surface portion 231, a rear glass portion 241 is arranged in a freely openable and closable manner.

As above, both the ROPS type tractor A1 and the cabin type tractor A2 are configured with the operation unit 3 arranged on the left and right base frames 5, 5' connected to the machine body frame 1, thus enabling secure fixing including the hot-wind blocking plate 100, 200.

The cabin type tractor A2 which is an embodiment of the present invention has the above-described basic structure.

Next, a specific structure of the hot-wind blocking plate 100, 200 which is a principal part of the present invention will be described, taking two types of tractors A1, A2 of ROPS type and cabin type as examples.

Description of Configuration of Hot-Wind Blocking Plate

Figure 3:
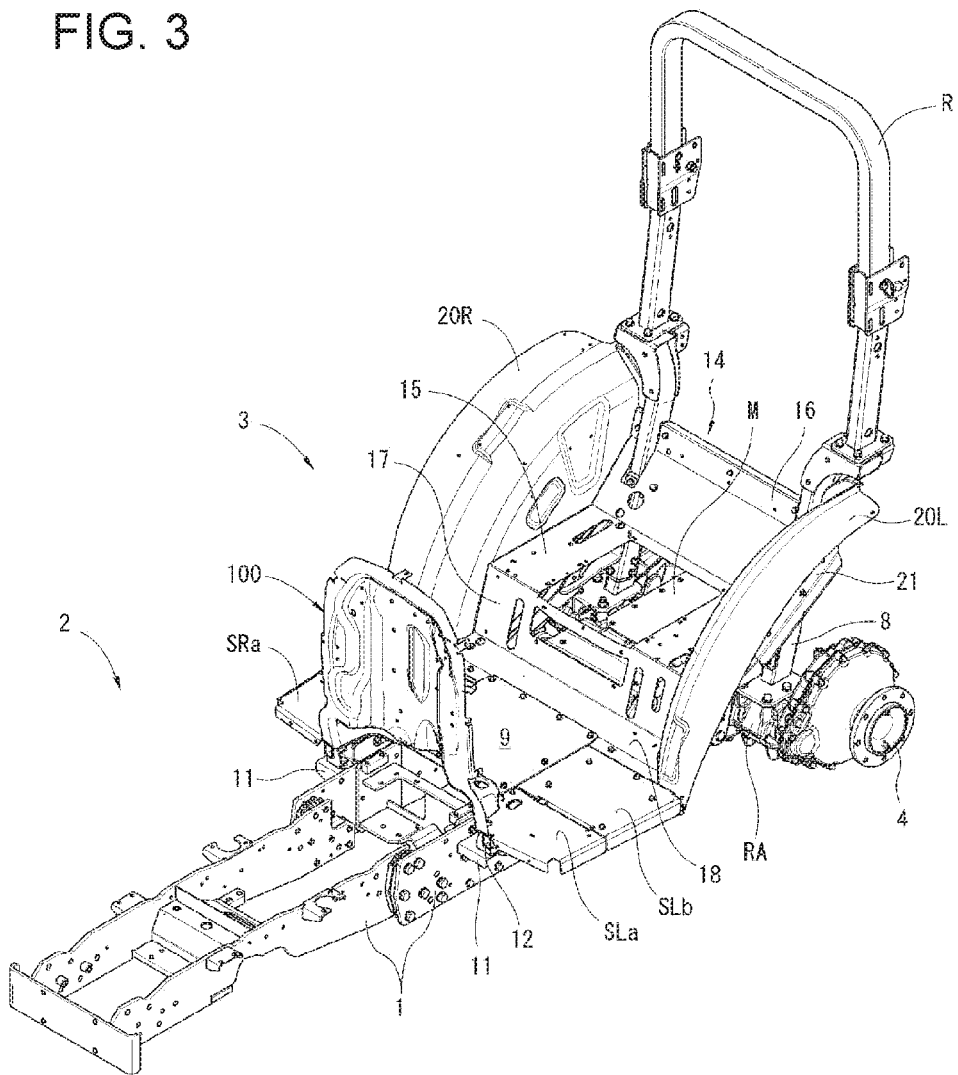
FIG. 3 is a perspective view showing the vicinity of a machine body frame of the ROPS type according to the embodiment.

The hot-wind blocking plate 100, 200 of the tractor A1, A2 according to the embodiment is disposed between the motor unit 2 and the operation unit 3 as shown in FIG. 3 and FIG. 23. The lower end edge of the hot-wind blocking plate 100, 200 is connected to the operation unit floor 9, and the upper end edge thereof is connected to the heat exhaust cover 90, 30 disposed at the rear end edge of the hood B.

The hot-wind blocking plate 100, 200 is provided for the purpose of partitioning and shielding the operation unit 3 from the motor unit 2 in order to prevent the operation unit 3 from being affected by heat that is generated by driving of the engine E of the motor unit 2. The hot-wind blocking plate 100, 200 is formed into a size and shape that can shield a rear end surface of the engine room of the motor unit 2, and the lower end edge of the hot-wind blocking plate 100, 200 is connected and fixed to the operation unit floor 9 with a bolt.

At the left and right end edges of the hot-wind blocking plate 100, 200, the windbreak plates 111 of the ROPS type or the left and right side front wall portions 227 of the cabin type are integrally formed. A front portion of the operation unit 3 is separated from front parts by the hot-wind blocking plate 100, 200 and the windbreak plates 111 or the left and right side front wall portions 227. The lower ends of outer edge frames GF of the windbreak plates 111 or the left and right side front wall portions 227 are connected to the left and right steps SL, SR, thereby supporting and fixing the left and right end edges of the hot-wind blocking plate 100, 200 integrated with the windbreak plates 111 or the left and right side front wall portions 227.

Next, a specific shape of the hot-wind blocking plate 100, 200, which is common to the ROPS type and the cabin type, will be described. As shown in FIG. 9 to FIG. 11 and FIG. 29 to FIG. 31, the hot-wind blocking plate 100, 200 is formed by a rectangular steel plate that is, except an outer edge portion 203 excluding an inner portion of the lower end edge thereof, stamped into a shape convex toward the operation unit 3 side. A central portion of the convex of the hot-wind blocking plate 100, 200 forms a mechanism flange convex portion 204 for allowing the steering mechanism 22 or the like to be arranged on the operation unit 3 side.

The lower end edge of the convex protrudes toward the operation unit 3 side farther than the mechanism flange convex portion 204, to form a floor coupling portion 205 that can be coupled to a flange 10 provided in the front end edge portion of the operation unit floor 9.

The hot-wind blocking plate 100, 200 is configured such that most of the outer edge portion 203 except the inner portion of the lower end edge has a flat shape and the mechanism flange convex portion 204 and the floor coupling portion 205 are convex toward the operation unit 3 side. Here, the reason why the floor coupling portion 205 is formed so as to protrude toward the operation unit 3 side farther than the mechanism flange convex portion 204 is because it allows the steering wheel spindle 26, a brake shaft 40, and a clutch shaft 41 included in a driving operation mechanism to be covered so as to be drawn out below the operation unit floor 9 without any burden and without being extremely bent.

Figure 10:
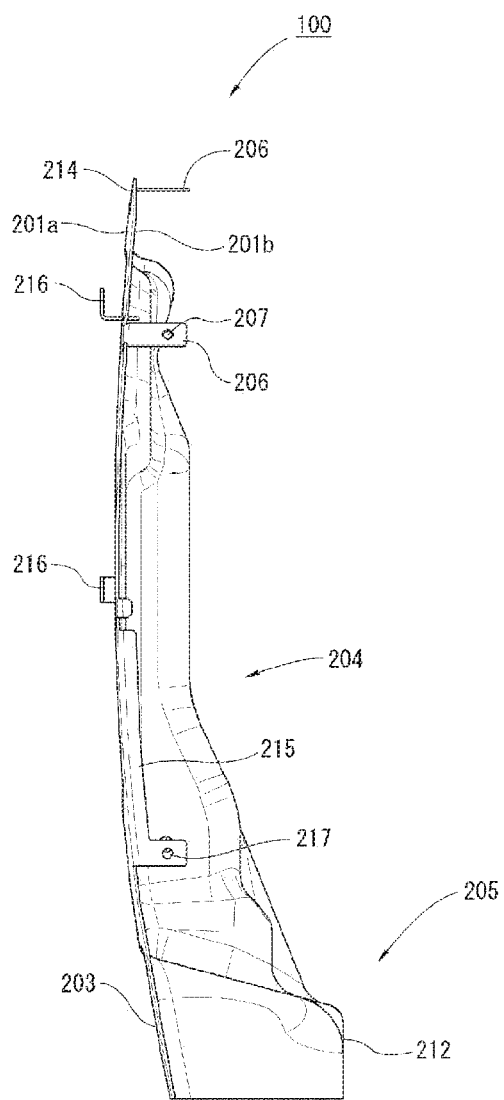
FIG. 10 is a right side view of the hot-wind blocking plate shown in FIG. 9.
Figure 11:
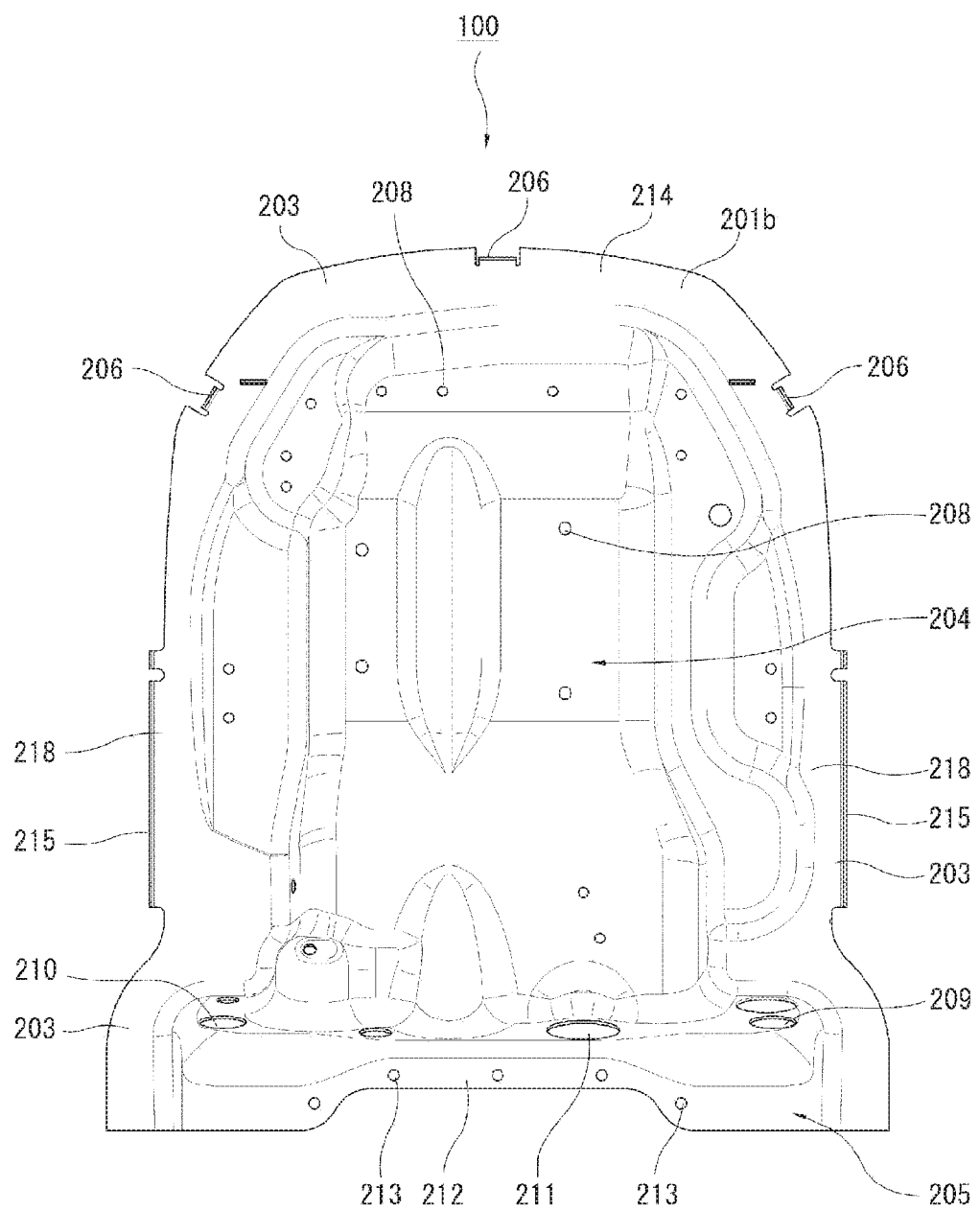
FIG. 11 is a rear elevational view (operation unit side) of the hot-wind blocking plate of the ROPS type according to the embodiment.
Figure 30:
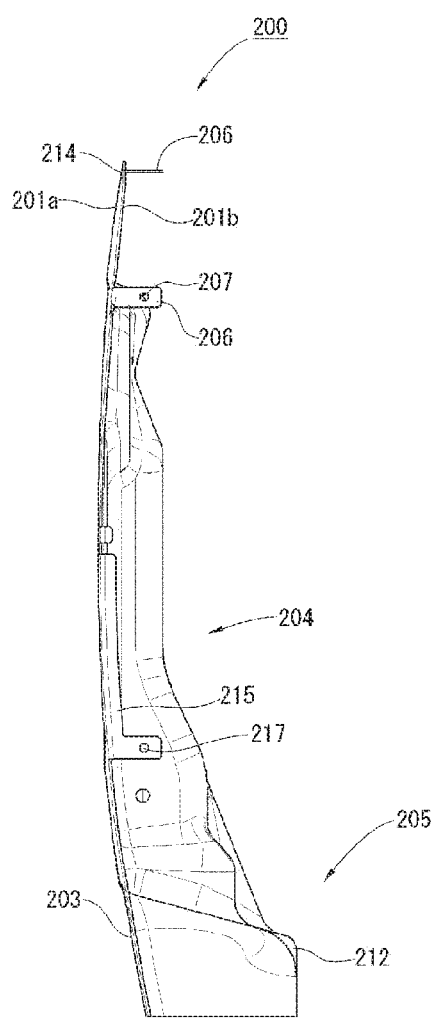
FIG. 30 is a right side view of the hot-wind blocking plate shown in FIG. 22.
Figure 31:
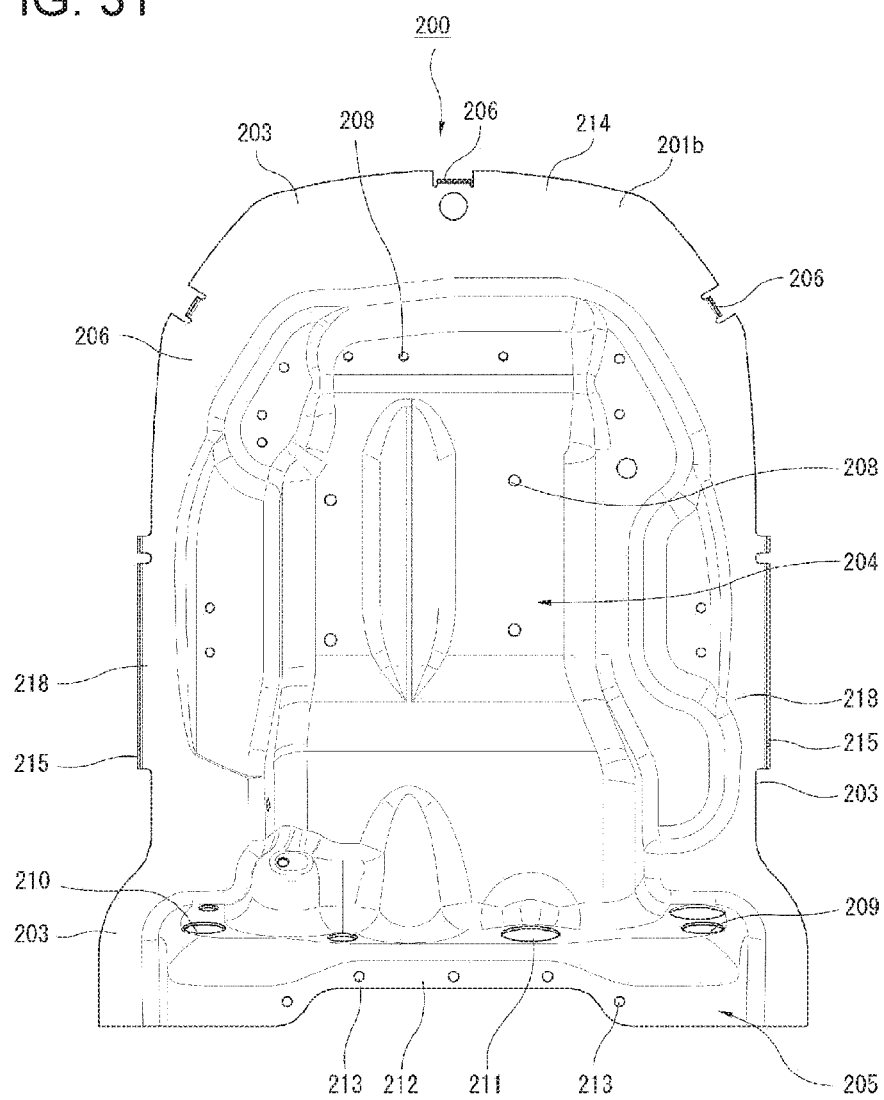
FIG. 31 is a rear elevational view (operation unit side) of the hot-wind blocking plate of the cabin type according to the embodiment.

In the hot-wind blocking plate 100, 200, as shown in FIG. 10 and FIG. 30, a substantially upper half portion of the mechanism flange convex portion 204 extends substantially vertically in a side view, and a substantially lower half portion of the mechanism flange convex portion 204 is curved from the motor unit 2 side toward the operation unit 3 side in a side view. That is, of the outer edge portion 203, a flat upper portion whose plane direction extends along the horizontal direction has its plane direction inclined toward the motor unit 2 side toward the bottom.

This configuration can avoid interference with a clutch mechanism (not shown) or another mechanism component part interlocked with, for example, the engine E of the motor unit 2 arranged directly in front of the hot-wind blocking plate 100, 200. This is particularly effective in order that mechanism component parts, which are densely arranged around the engine E, etc. but cannot be housed within the motor unit 2, can be arranged without influencing the operation unit 3.

Figure 28:
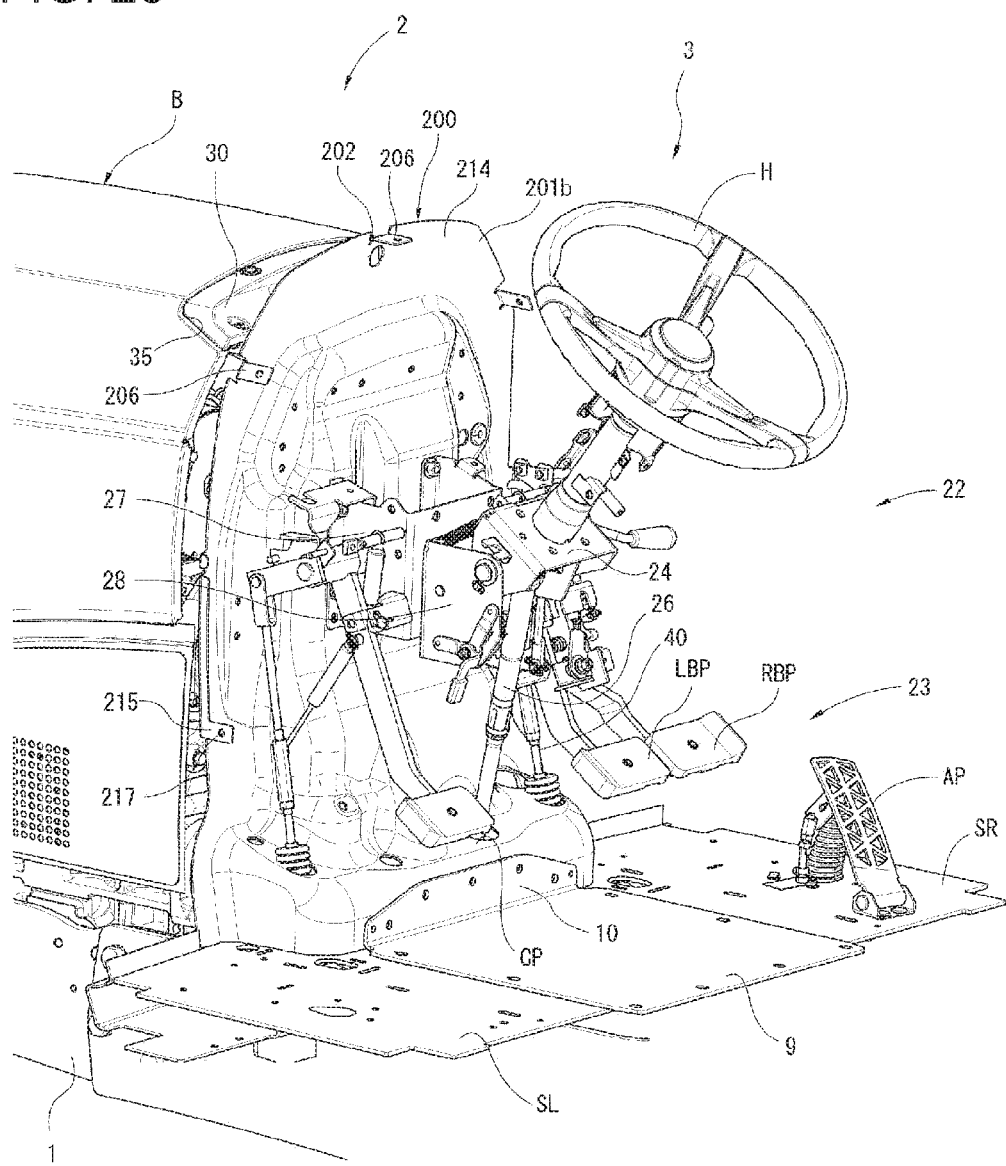
FIG. 28 is a perspective view showing a part of the operation unit of the cabin type according to the embodiment.
Figure 29:
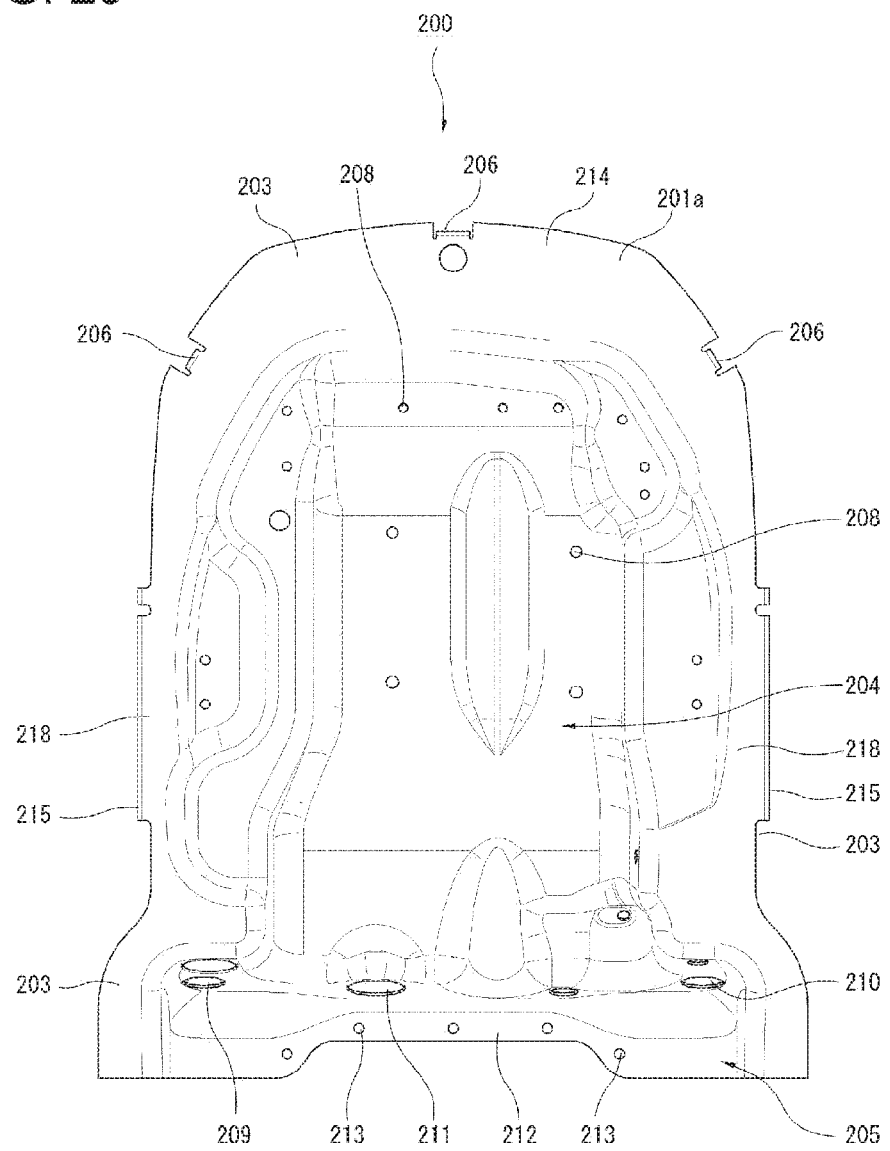
FIG. 29 is a front elevational view (motor unit side) of the hot-wind blocking plate of the cabin type according to the embodiment.

As shown in FIG. 7, FIG. 28, and the like, upper dashboard mounting flanges 206 each having a rectangular shape and formed by being bent toward the operation unit 3 side are provided in an upper central portion and in upper left and right portions of the outer edge portion 203 of the hot-wind blocking plate 100, 200. The upper dashboard mounting flange 206 has, in a central portion at the distal end of the upper dashboard mounting flange 206, a bolt insertion hole 207 for enabling an upper portion of the dashboard 25 shown in FIG. 6 and FIG. 26, which constitutes a part of the operation unit component, to be fastened to the operation unit 3 side of the hot-wind blocking plate 100, 200 with a bolt.

As shown in FIG. 7, FIG. 28, and the like, lower dashboard mounting flanges 215 each having an L-like shape in a side view and formed by being bent toward the operation unit 3 side are provided in left and right middle portions 218 of the outer edge portion 203 of the hot-wind blocking plate 100, 200. The lower dashboard mounting flange 215 has, in a central portion at the distal end of a lower piece of the lower dashboard mounting flange 215, a bolt insertion hole 217 for enabling a lower portion of the dashboard 25 shown in FIG. 6 and FIG. 26, which constitutes a part of the operation unit component, to be fastened the operation unit 3 side of the hot-wind blocking plate 100, 200.

A level at which the lower dashboard mounting flange 215 is formed differs depending on the height of the dashboard 25.

The mechanism flange convex portion 204 has a plurality of bolt insertion holes 208 for fixing or mounting an operation unit component necessary for operation of the tractor A1, A2, such as the steering mechanism 22 and each operation pedal 23.

The floor coupling portion 205 is, at the left and right end sides thereof, connected to the outer edge portion 203. An upper surface thereof is connected to the lower end edge of the mechanism flange convex portion 204. A brake shaft hole 209, a clutch shaft hole 210, and a steering wheel spindle hole 211 are formed in a right side portion, a left side portion, and a substantially central portion of the upper surface protruding toward the operation unit 3 side, respectively.

The upper surface of the floor coupling portion 205 extends downward from its rear end, to form a rear end wall 212 having a substantially inverted U shape. The rear end wall 212 has a plurality of bolt insertion holes 213 arranged along the inverted U shape, which are connected to a plurality of bolt holes 10a of the flange 10 of the operation unit floor 9 so that the floor coupling portion 205 and the operation unit floor 9 are coupled to each other with a bolt and nut.

Described above is the common configuration of the hot-wind blocking plate 100, 200 included in the ROPS type and cabin type tractors A1, A2 according to the embodiment. In the following, an essence of the present invention which is derived from a difference between the two types will be described.

The ROPS type tractor A1 does not need the front glass portion 226 because no cabin C is provided. Since the wiper mechanism W is also not needed, it is not necessary to ensure a region for installation of the wiper mechanism W or to form the wiper shaft hole 202 in the upper portion of the outer edge portion 203 of the hot-wind blocking plate 100.

On the other hand, the cabin type tractor A2 in which the operation unit 3 is enclosed by the cabin C has the front glass portion 226 provided on the upper portion of the front surface portion 225 of the cabin C, and also needs the wiper mechanism W.

Thus, the hot-wind blocking plate 200 of the cabin type requires that, of the outer edge portion 203, the upper end edge portion 214 be formed at a higher level as compared to that of the hot-wind blocking plate 100 of the ROPS type, for enabling installation of the wiper mechanism W and formation of the wiper shaft hole 202. In other words, the upper end edge portion 214 of the hot-wind blocking plate 100 of the ROPS type can be provided at a lower level as compared to that of the cabin type.

The hot-wind blocking plate according to the embodiment has its configuration common to two specifications, except the upper end edge portion 214 and the left and right middle portions 218 of the outer edge portion 203. Thus, a die for manufacturing the hot-wind blocking plate 200 of the cabin type is prepared on the assumption that it is a sharable element; and when manufacturing the hot-wind blocking plate 100 of the ROPS type, it suffices to prepare such a punching die that a part of the upper end edge portion 214 that is not necessary for the ROPS type is removed, the left and right middle portions 218 of the outer edge portion 203 are given a large width, such that a new upper end edge portion 214 and new left and right middle portions 218 can be formed including likewise upper and lower dashboard mounting flanges 206, 215.

The hot-wind blocking plate 100, 200 according to the embodiment has been described based on the ROPS type and cabin type tractors A1, A2 as an example, but cutting or stamping the outer edge portion 203 enables the hot-wind blocking plate 100, 200 to be applicable to various specifications having different heights and widths of the hood B due to differences in the size of the engine E.

For connection of the windbreak plate 111 to the hot-wind blocking plate 100 of the ROPS type, as shown in FIG. 6, one end portion of the outer edge frame GF having an L-like shape formed of a hollow square pipe which constitutes a frame body of the windbreak plate 111 is connected by welding or with a bolt to a middle portion of the outer edge portion 203 of the hot-wind blocking plate 100 on the operation unit 3 side, while the other end portion is connected by welding or with a bolt to each of the left and right steps SL, SR fixed to the left and right base frames 5.

Figure 25:
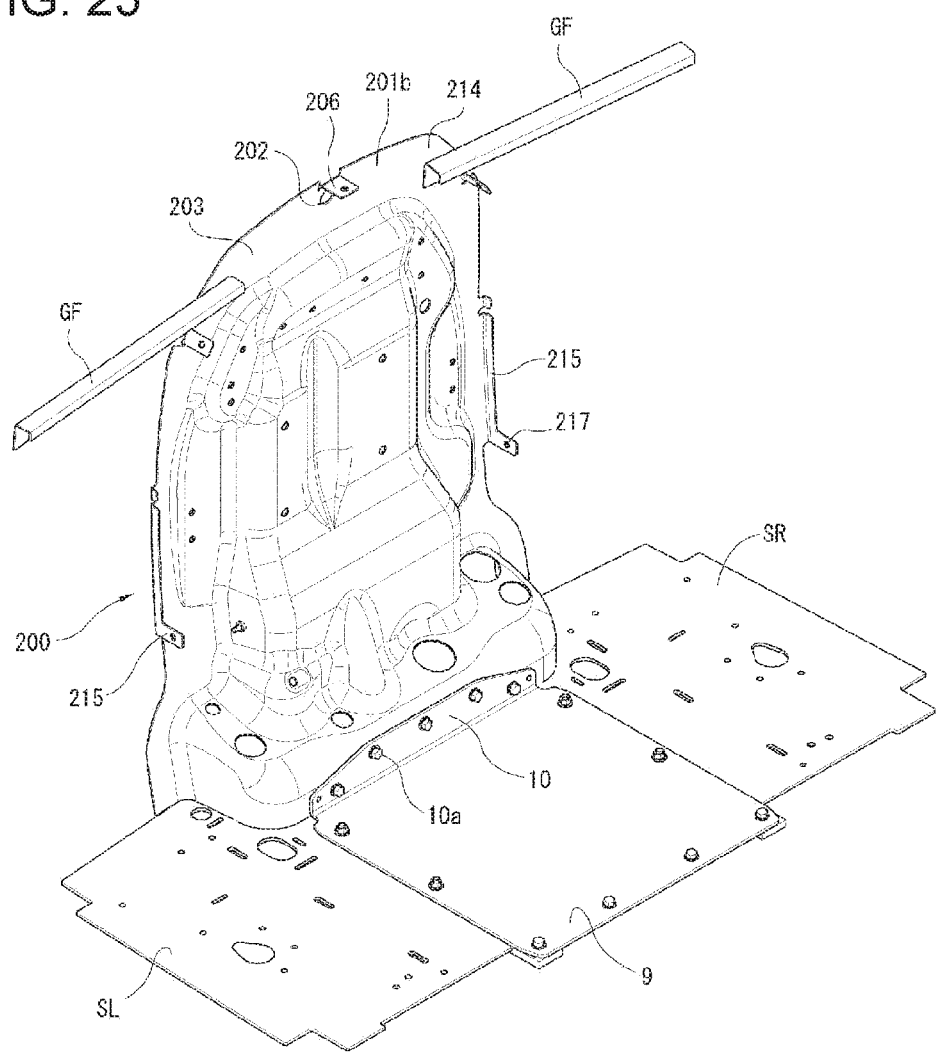
FIG. 25 is a perspective view showing the vicinity of a hot-wind blocking plate of the cabin type according to the embodiment.

Likewise, for connection of the left and right side front wall portions 227 to the hot-wind blocking plate 200 of the cabin type, as shown in FIG. 25, the outer edge frame GF is connected by welding or with a bolt to a middle portion of the outer edge portion 203 of the hot-wind blocking plate 200 on the operation unit 3 side.

This way, in connection of the outer edge frames GF of the windbreak plates 111 or the left and right side front wall portions 227 to the hot-wind blocking plate 100, 200, it is not necessary that the hot-wind blocking plate 100, 200 has different configurations corresponding to two specifications.

As shown in FIG. 8, the heat exhaust cover 90 (30) arranged between the hood B and the hot-wind blocking plate 100 (200) is integrally formed by connecting hot-wind blocking plate flanges 216 to predetermined portions of the hot-wind blocking plate 100, 200 on the motor unit 2 side by welding, the hot-wind blocking plate flanges 216 being fixable by screwing to heat exhaust cover flanges 39 of the heat exhaust cover 90 (30) with bolts. Accordingly, even if the height of the hood B changes depending on the presence or absence of cutting of the upper end edge portion 214 of the hot-wind blocking plate 100, 200, it can be addressed by appropriately arranging the hot-wind blocking plate flanges 216 at predetermined portions of the hot-wind blocking plate 100, 200.

In the tractor A1, A2 according to the embodiment configured as thus far described; the hot-wind blocking plate 100, 200 is disposed between the motor unit 2 and the operation unit 3; the dimension of the blocking plate 100, 200 is adjustable by cutting the outer edge portion 203 of the hot-wind blocking plate 100, 200; an operation unit component is mounted to the outer edge portion 203 of the hot-wind blocking plate 100, 200; and a position where the operation unit component is mounted is changeable depending on specifications of the operation unit 3. Accordingly, the hot-wind blocking plate 100, 200 can serve as a sharable element, and in addition most of operation unit components can also serve as sharable elements, thus enabling mass production of the hot-wind blocking plate 100, 200 and most of the operation unit components under the same standard, which leads to an efficient inventory storage and an advantage in costs.

Even for different specifications having different heights of the hood B due to a difference in the size of a motor (engine E) mounted, the vertical dimension can be adjusted by cutting the outer edge portion 203 of the hot-wind blocking plate 100, 200. Thus, the same hot-wind blocking plate 100, 200 can be shared among tractors of different specifications if the adjustment is made by cutting, which enables mass production under the same standard and also enables esthetic appearance to be satisfied because a large change of external appearance is not caused.

Since the cutting of the outer edge portion 203 of the hot-wind blocking plate 100, 200 can be implemented with a cutting die or the like, processing into a hot-wind blocking plate adapted for another specification is easy. This is advantageous in manufacturing costs as compared to separately manufacturing a special hot-wind blocking plate adapted for a specification.

Since the height of the blocking plate 200 can be adjusted by cutting the upper end edge portion 214 of the outer edge portion 203 of the hot-wind blocking plate 200 and the dashboard 25 serving as an operation unit component is mounted to the upper end edge portion 214 of the hot-wind blocking plate 200 with the height position of the dashboard 25 being adjustable; many members necessary for the dashboard 25 can be commonly used as sharable elements for specifications of different heights, thus enabling mass production under the same standard, enabling an efficient inventory storage, and providing an advantage in costs.

The wiper shaft hole 202 for attachment of a wiper is formed in the upper end edge portion 214 of the hot-wind blocking plate 200 before cutting, and whether or not to cut the upper end edge portion 214 of the hot-wind blocking plate 200 is selected depending on whether the type is the cabin type which requires the wiper mechanism W or the ROPS type which requires no wiper. Adapting the cutting to a standard enables dual use of the hot-wind blocking plate 200 of the same standard. Particularly in the ROPS type, merely cutting the hot-wind blocking plate 200 can ensure a good field of view in driving with suppression of the height of the hot-wind blocking plate 200, while if no cutting is made, the hot-wind blocking plate 200 can be used with the wiper mechanism W attached thereto in the cabin type. Thus, mass production under the same standard is enabled from the beginning of the manufacture of the hot-wind blocking plate 200. Due to the same standard products, an inventory storage can be efficiently made, and an advantage in costs increases accordingly.

Figure 12:
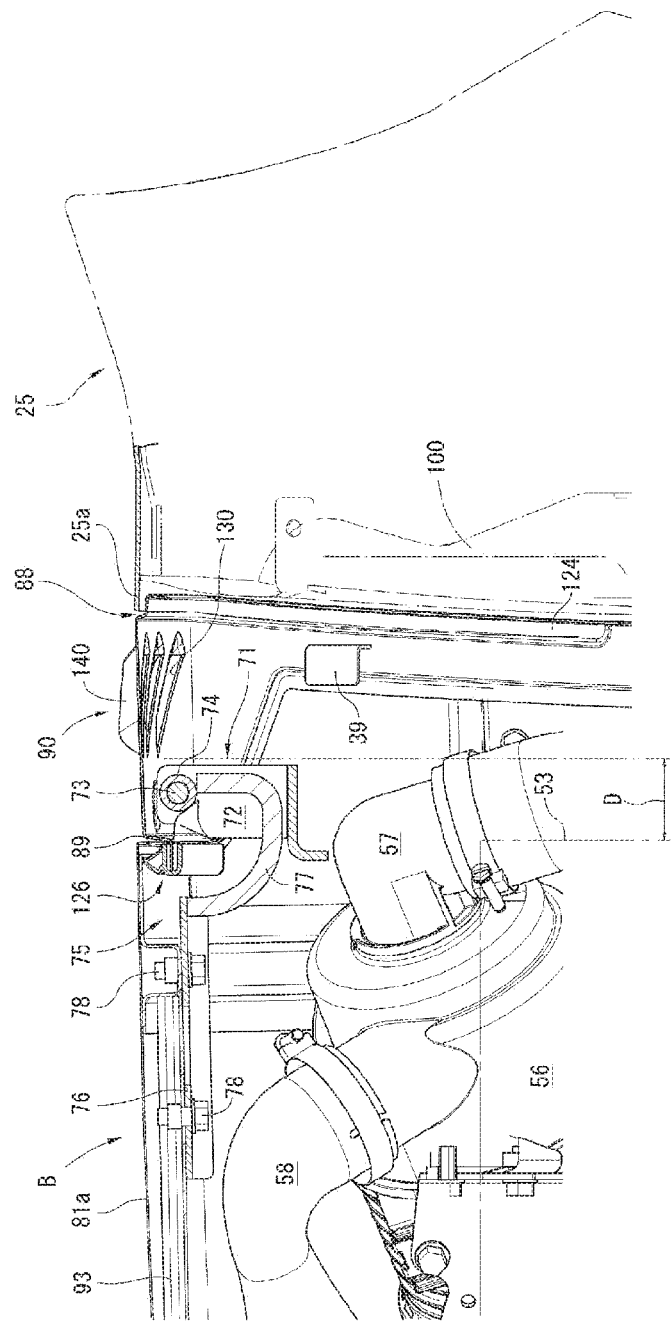
FIG. 12 is a side cross-sectional view of a hood pivotal support portion of the ROPS type according to the embodiment.
Figure 13:
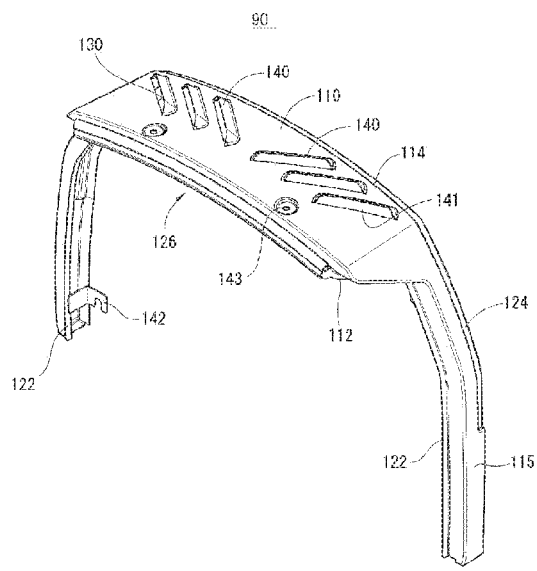
FIG. 13 is a perspective view for illustrating a heat exhaust cover of the ROPS type according to the embodiment.
Figure 14:
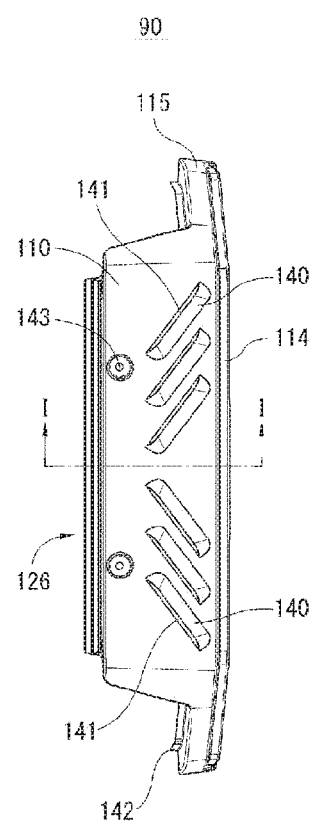
FIG. 14 is a plan view of the heat exhaust cover of the ROPS type according to the embodiment.
Figure 15:
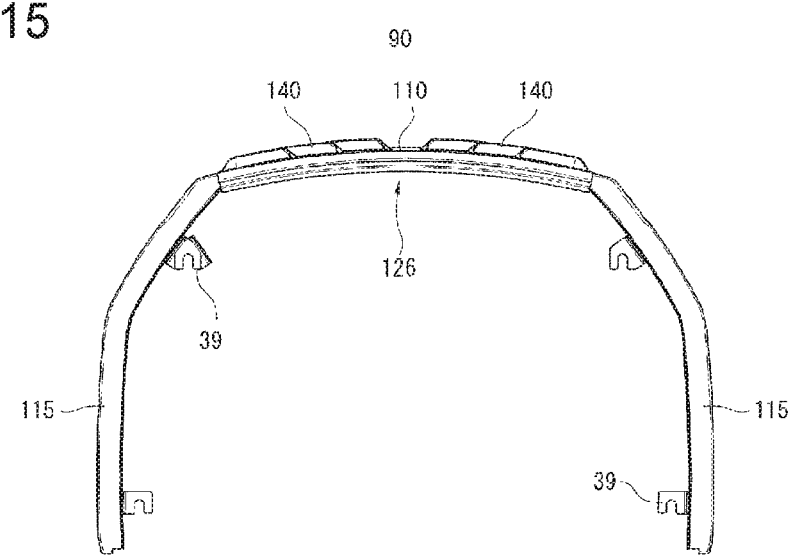
FIG. 15 is a front elevational view of the heat exhaust cover of the ROPS type according to the embodiment.
Figure 16:
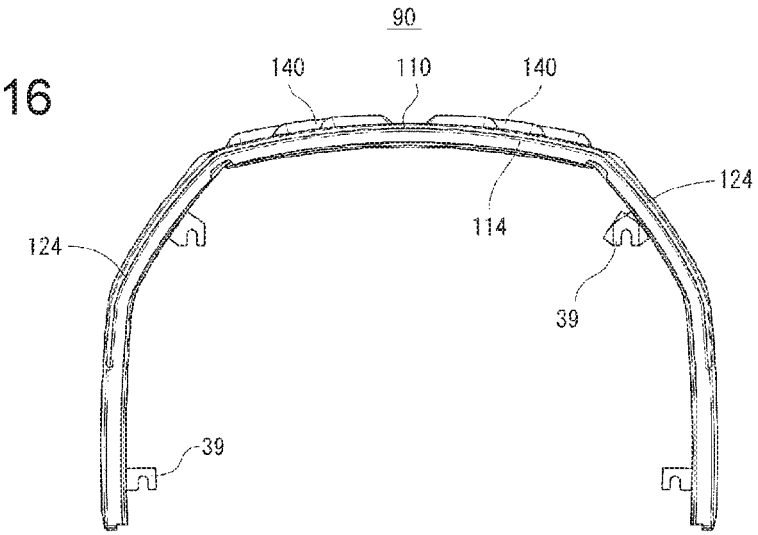
FIG. 16 is a rear elevational view of the heat exhaust cover of the ROPS type according to the embodiment.
Figure 17:
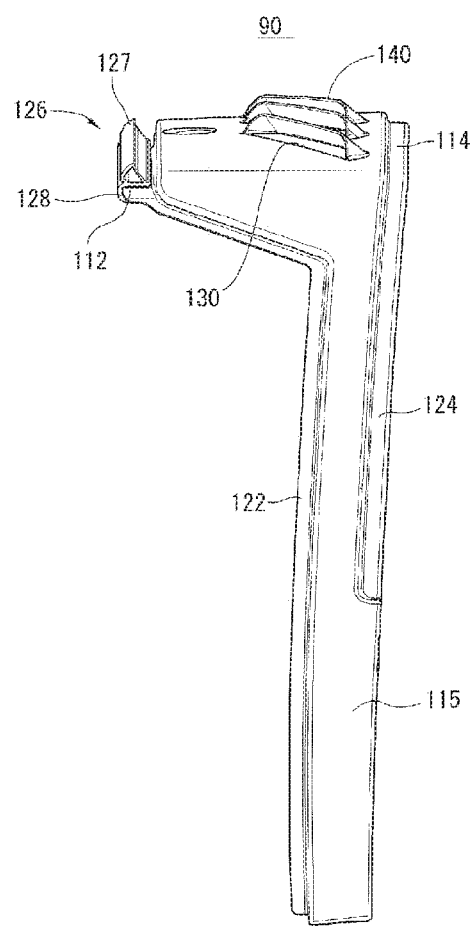
FIG. 17 is a side view of the heat exhaust cover of the ROPS type according to the embodiment.
Figure 18:
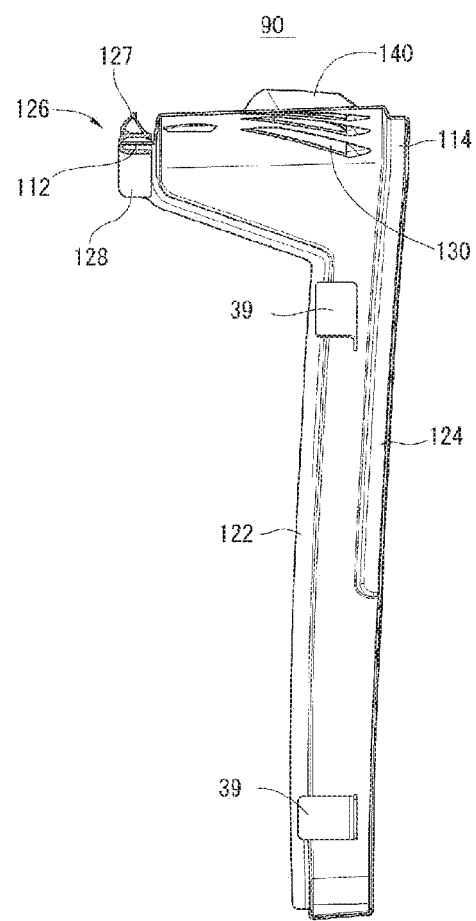
FIG. 18 is a cross-sectional view as taken along the line I-I of FIG. 14.
Figure 32:
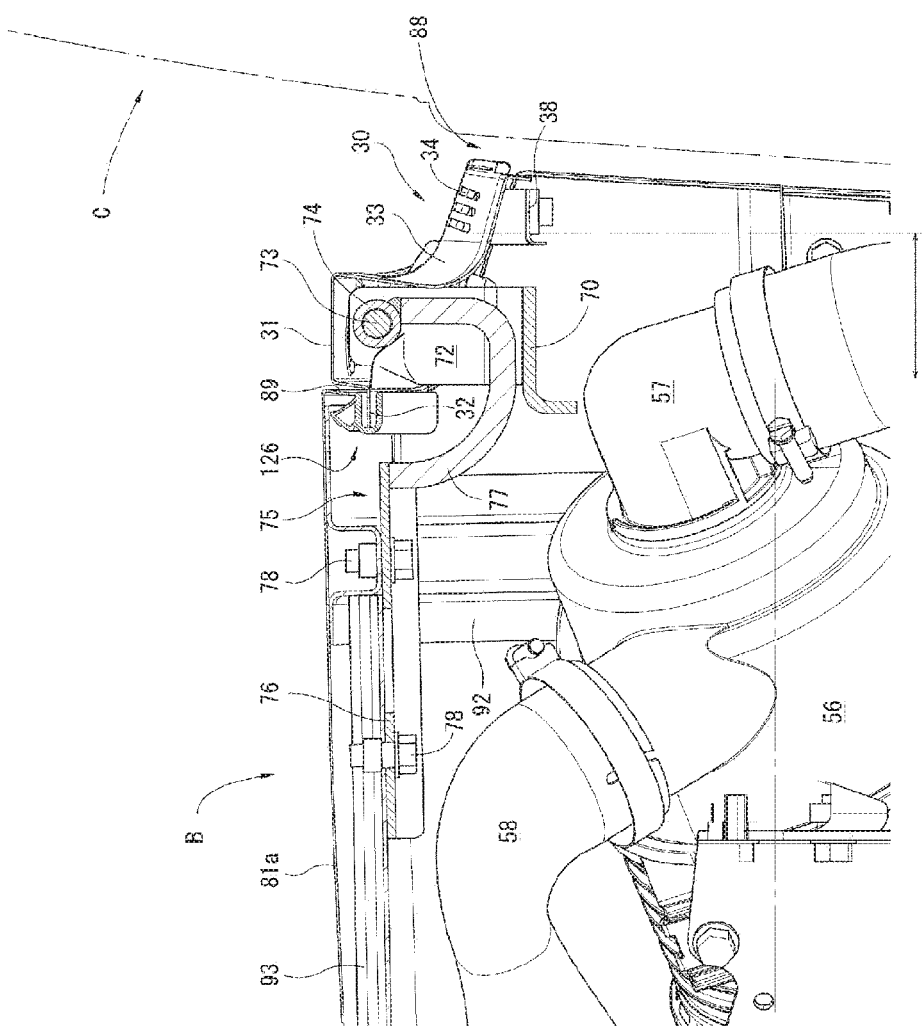
FIG. 32 is a left side cross-sectional view of a hood pivotal support portion of the cabin type according to the embodiment.
Figure 33:
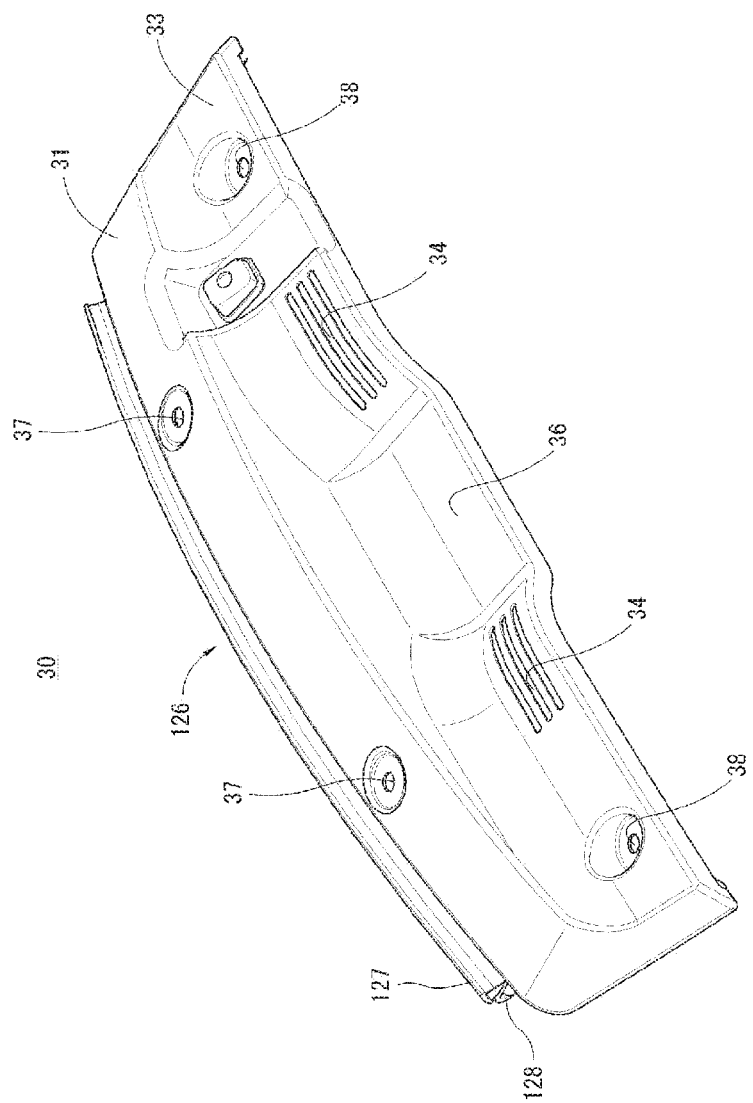
FIG. 33 is a perspective view for illustrating a heat exhaust cover of the cabin type according to the embodiment.
Figure 34:
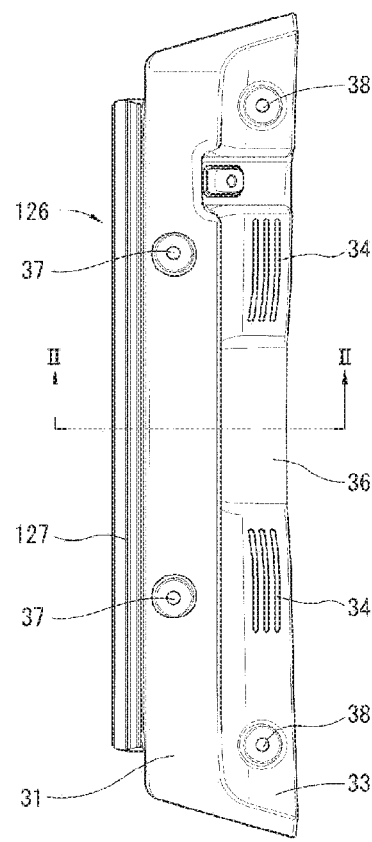
FIG. 34 is a plan view of the heat exhaust cover of the cabin type according to the embodiment.
Figure 35:
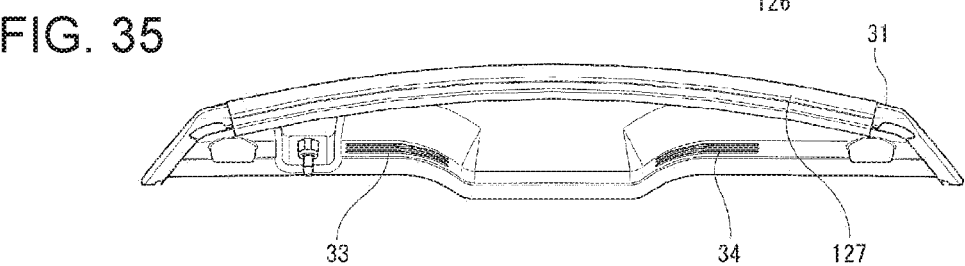
FIG. 35 is a front elevational view of the heat exhaust cover of the cabin type according to the embodiment.
Figure 36:
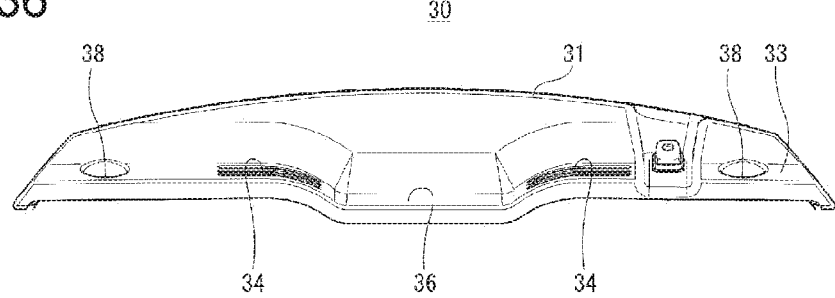
FIG. 36 is a rear elevational view of the heat exhaust cover of the cabin type according to the embodiment.
Figure 37:
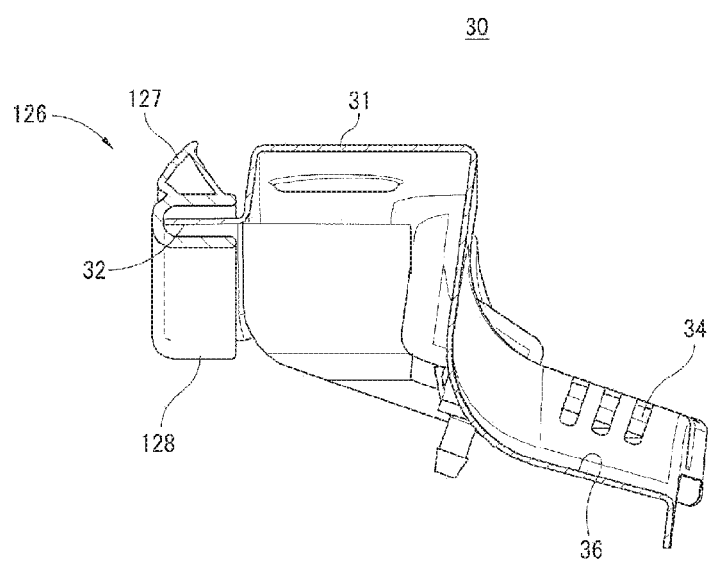
FIG. 37 is a cross-sectional view as taken along the line II-II of FIG. 34.

As shown in FIG. 12 and FIG. 32, the hood B is pivotally supported in a freely openable and closable manner through a pivotal support portion 71. The pivotal support portion 71 includes: a pivotal support piece 72 having a U-like shape in a front elevational view; a pivot 73 laid horizontally between upper end portions of the pivotal support piece 72 with the axis line of the pivot 73 extending along the left-right direction; a boss portion 74 fit onto the pivot 73 in a freely rotatable manner; and an open/close arm 75 whose proximal end edge portion is attached to the boss portion 74. The open/close arm 75 includes an arm front portion 76 in the shape of a square plate ring, and an arm rear portion 77 curved downward so as to form a U-like shape in a side view. The arm rear portion 77 has its rear end edge portion pivotally supported on the pivot 73 through the boss portion 74, and its front end edge portion integrally connected to a rear end edge portion of the arm front portion 76. Moreover, a rear end portion of the hood B is attached to the arm front portion 76 with a coupling bolt 78 through a front-rear extending frame 93. Thus, the hood B is openable by its front end side being rotated upward about the pivot 73 as a hood fulcrum. At this time, the arm rear portion 77 of the open/close arm 75, which is curved downward, prevents the rear end edge portion of the hood B from interfering with a later-described heat exhaust cover 30 that covers the pivot 73 from directly above, which may otherwise obstruct the opening movement of the hood B. The reference sign 56 indicates an air cleaner. The air cleaner 56 is communicably coupled to the engine E through a proximal end side intake tube 57. A distal end side intake tube 58 is communicably coupled to the air cleaner 56.

Description of Configuration of Heat Exhaust Cover of ROPS Type

As shown in FIG. 12 to FIG. 18, the heat exhaust cover 90 of the ROPS type has an inverted U shape which is the same as the shape of the rear end edge portion of the hood B in a rear elevational view, the inverted U shape being defined by: a front-rear wide part 110 corresponding to a ceiling surface 81a of the ceiling surface portion 81; and front-rear narrow parts 115 corresponding to left and right side surfaces 81b,81b of the ceiling surface portion 81 and left and right side surface portions 83, 83. The front-rear width of the front-rear wide part 110 is substantially 1/11 of the front-rear width of the hood B, and the front-rear narrow part 115 has a short front-rear width that is substantially 1/4 of that of the front-rear wide part 110. A front end edge portion 112 of the front-rear wide part 110 and front end edge portions 122 of the front-rear narrow parts 115, each of which is in the shape of a stepped recess, are integrally formed into a bent shape in a side view. A rear end edge portion 114 of the front-rear wide part 110 and rear end edge portions 124 of upper half portions of the front-rear narrow parts 115, each of which is in the shape of a stepped recess, are integrally formed so as to extend along a virtual vertical end surface having a single plane. The rear end edge portion of the hood B is configured to be inlay-fittable in abutment with the front end edge portion 112 of the front-rear wide part 110 and the front end edge portions 122 of the front-rear narrow parts 115 each having a stepped recess shape. A front end edge portion 25a of an upper portion of the dashboard 25 has a stepped convex shape which is inlay-fittable in abutment with the rear end edge portion 114 of the front-rear wide part 110 and the rear end edge portions 124 of the upper half portions of the front-rear narrow parts 115 each having a stepped recess shape. Surfaces of the hood B, the heat exhaust cover 90, and the dashboard 25 are on a single plane. The heat exhaust cover 90 is made of a material (e.g., an iron plate) having a thermal conductivity that enables heat to be dissipated to atmosphere and a rigidity that makes the heat exhaust cover 90 less likely to be damaged by a falling object such as a stone.

The front-rear wide part 110 covers the pivot 73 of the pivotal support portion 71 from the upper side, and the front end edge portion 112 of the front-rear wide part 110 is arranged adjacent to the pivot 73 of the pivotal support portion 71. A rear end edge portion 89 of the ceiling surface 81a of the hood B in the closed state internally and externally overlaps the front end edge portion 112 of the front-rear wide part 110, with a sealing material 126 for keeping a sealability disposed between overlapping portions. The sealing material 126, which extends in the left-right direction, has substantially the same width as the left-right width of the front end edge portion 112 of the front-rear wide part 110. When the hood B is closed, the rear end edge portion 89 of the ceiling surface 81a, which has a shape folded at a right angle, is in abutment with a peripheral surface of a rear half portion of the seal main piece 127, such that the sealability can be kept well.

A plurality of (in this embodiment, six) heat exhaust holes 130 are formed in the front-rear wide part 110 at intervals with respect to the left-right direction. The heat exhaust hole 130 is an elongated hole extending in the front-rear direction, with its front end directed inward and its rear end directed outward. In a rear end edge portion of the heat exhaust hole 130, a heat exhaust guide piece 140 protrudes. Thus, exhaust heat flowing out of the motor unit 2 through the heat exhaust hole 130 is guided laterally outward through the heat exhaust guide piece 140.

More specifically, three of the heat exhaust holes 130 are arranged inclined in parallel to one another in a left half portion of the front-rear wide part 110, while the other three are arranged inclined in parallel to one another in a right half portion of the front-rear wide part 110, such that the three and the three are arranged line-symmetrically with respect to the left-right direction so as to form an inverted V shape. In the rear end edge portion of each heat exhaust hole 130, the heat exhaust guide piece 140 protrudes so as to rise upward. The heat exhaust guide piece 140 has its opening surface 141 oriented laterally outward at an angle of substantially 45 degrees from the front. Exhaust heat in the hood B is discharged to the outside through the three heat exhaust holes 130 of the left half portion such that it is discharged along the heat exhaust guide pieces 140 from their opening surfaces 141 toward the left front, while the exhaust heat is discharged to the outside through the three heat exhaust holes 130 of the right half portion such that it is discharged along the heat exhaust guide pieces 140 from their opening surfaces 141 toward the right front. This way, by the heat exhaust guide pieces 140, the exhaust heat discharged from the respective heat exhaust holes 130 spreads outward to left and right with respect to the direction opposite to the direction in which the machine body travels. Thus, a driving operator seated on the driver seat 13 arranged at the rear of the heat exhaust holes 130 is not exposed to the exhaust heat. As for the arrangement position relationship of the heat exhaust holes 130 relative to a DPF 53, the DPF 53 is not arranged in a position directly below the heat exhaust holes 130. In this embodiment, the DPF 53 is arranged frontward of the heat exhaust holes 130, so that even when rain water or washing water enters through the heat exhaust holes 130, the rain water or the like is prevented from contacting the DPF 53 which generates heat.

In the tractor A1 configured above, the heat exhaust cover 90 having the heat exhaust holes 130 is disposed in the gap 88 formed between the operation unit 3 and the hood B that covers the motor unit 2. This enables heat generated in the motor unit 2 to be reliably discharged into atmosphere through the heat exhaust holes 130 of the heat exhaust cover 90. In addition, even when rain water or car-washing water enters through the heat exhaust holes 130, the rain water or the like can flow out (be discharged) to the outside at a location behind the motor unit 2, because the heat exhaust cover 90 is arranged behind the hood B that covers the motor unit 2. Accordingly, even when the DPF 53 which generates heat is arranged in the motor unit 2, it is easy to arrange the DPF 53 in a position where rain water or the like does not drop through the heat exhaust holes 130. Thus, it can be avoided that the rain water or the like contacts the DPF 53 to be vaporized and diffused. The heat exhaust cover 90 is able to cover the gap 88 formed between the hood B and the operation unit 3. Thus, downsizing of the hood B and improvement in esthetic appearance of the tractor A2 can be obtained simultaneously.

Moreover, the front end edge portion of the heat exhaust cover 90 arranged adjacent to the pivotal support portion and the rear end edge portion of the hood B in the closed state overlap each other with respect to the vertical direction, and between them, the sealing material 126 is disposed for keeping the sealability. Thus, the sealability of a connecting portion where the front end edge portion of the heat exhaust cover 90 is connected to the rear end edge portion of the hood B can be obtained well due to the sealing material 126, and entry of rain water or the like through the connecting portion can be prevented. At this time, the front-rear wide part 110 of the heat exhaust cover 90 covers, from the upper side, the pivot 73 of the pivotal support portion 71 that pivotally supports the hood B via the open/close arm 75, and the front end edge portion of the front-rear wide part 110 is arranged adjacent to the pivot 73. Thus, a connecting portion where the front end edge portion of the front-rear wide part 110 is connected to the rear end edge portion 89 of the ceiling surface 81a of the hood B can be arranged adjacent to the pivot 73, which can prevent a variation in the connecting position. This makes it possible to seal up the connecting portion with a good accuracy. That is, sealability can be ensured well.

Furthermore, the exhaust heat flowing out of the motor unit 2 through the heat exhaust holes 130 is guided laterally outward by the heat exhaust guide pieces 140. This can prevent the operator operating the operation unit 3 from being directly exposed to the exhaust heat moving outward toward the rear. Accordingly, dwelling comfort of the operator can be ensured well even though the operation unit 3 is not covered with the cabin C.

The heat exhaust cover 90 is made of a material (e.g., an iron plate) having a thermal conductivity that enables heat to be dissipated to atmosphere and a rigidity that makes the heat exhaust cover 90 less likely to be damaged by a falling object such as a stone. Thus, the thermal conductivity of the heat exhaust cover 90 allows heat generated in the motor unit 2 to be reliably dissipated to atmosphere, while the rigidity of the heat exhaust cover 90 can prevent damage due to a falling object such as a stone. Accordingly, esthetic appearance of the heat exhaust cover 90 can be ensured well.

Description of Configuration of Heat Exhaust Cover of Cabin Type

As shown in FIG. 32 to FIG. 37, the heat exhaust cover 30 of the cabin type includes: a cover front portion 31 that covers the pivot 73 of the pivotal support portion 71 from the upper side; and a cover rear portion 33 that covers the pivot 73 from the rear side. The cover rear portion 33 forms a recess extending in the left-right direction. The cover rear portion 33 has heat exhaust holes 34 which are elongated holes extending in the left-right direction.

More specifically, as shown in FIG. 19 and FIG. 20, a rear end portion of the ceiling surface 81a of the hood B is cut out in the shape of a horizontally long trapezoid toward the front, thus forming a heat exhaust cover arrangement recess 35. The heat exhaust cover 30 is arranged in the heat exhaust cover arrangement recess 35. The heat exhaust holes 34 are elongated in the left-right direction. In a left side portion of the cover rear portion 33, three of the heat exhaust holes 34 are arranged in parallel to one another with respect to the front-rear direction. In a right side portion of the cover rear portion 33, three of the heat exhaust holes 34 are arranged in parallel to one another with respect to the front-rear direction. Between the left and right sets of heat exhaust holes 34, that is, in a central portion of the cover rear portion 33, a central recess 36 which is a deeper recess is formed, to ensure a space for avoidance of interference with a base of the front wiper 262, a jet portion of a front glass washer (not shown), and the like. In a lower portion of a front surface of the cover front portion 31, a front end edge portion 32 having a slightly smaller width than the left-right width of the cover front portion 31 is provided so as to extend and protrude frontward. A sealing material 126 is attached to the front end edge portion 32.

The heat exhaust cover 30 is made of a material (e.g., an iron plate) having a thermal conductivity that enables heat to be dissipated to atmosphere and a rigidity that makes the heat exhaust cover 30 less likely to be damaged by a falling object such as a stone. Thus, the thermal conductivity of the heat exhaust cover 30 allows heat generated in the motor unit 2 to be reliably dissipated to atmosphere, while the rigidity of the heat exhaust cover 30 can prevent damage due to a falling object such as a stone. Accordingly, esthetic appearance of the heat exhaust cover 30 can be ensured well.

The sealing material 126, which extends in the left-right direction, has substantially the same width as the left-right width of the front end edge portion 32. The sealing material 126 is integrally formed of an elastic material, and includes a seal main piece 127 having a cylindrical shape extending in the left-right direction and a seal attachment piece 128 having a C-like shape in a cross-sectional view extending in the left-right direction. The seal attachment piece 128 is attached to the front end edge portion 32 by being fitted thereonto from the front side. The seal main piece 127 is integrally formed on an upper surface of the seal attachment piece 128. The rear end edge portion 89 of the ceiling surface 81a of the hood B has a shape folded at a right angle. When the hood B is closed, the rear end edge portion 89 of the ceiling surface 81a, which has a shape folded at a right angle, is in abutment with a peripheral surface of a rear half portion of the seal main piece 127, such that the sealability can be kept well.

As shown in FIG. 20, the heat exhaust holes 34 are arranged at constant intervals D at the rear of the DPF 53. Thus, even when rain water or washing water enters through the heat exhaust holes 34, the rain water or the like does not contact the DPF 53 which generates heat.

The reference signs 37 indicate cover front portion mounting holes formed in left and right side portions of the cover front portion 31. Each cover front portion mounting hole 37 is formed in alignment with each cover front portion attaching hole (not shown) such that the cover front portion 31 can be attached by screwing. The reference signs 38 indicate cover rear portion mounting holes formed in left and right side portions of the cover rear portion 33. Each cover rear portion mounting hole 38 is formed in alignment with each of the above-described cover rear portion attaching holes (not shown), such that the cover rear portion 33 can be attached by screwing.

In the heat exhaust cover 30 having the above-described configuration, the cover rear portion 33 of the heat exhaust cover 30 forms a recess extending in the left-right direction. Thus, even when the operation unit 3 is covered with the cabin C, it can be avoided that the cover rear portion 33 interferes with the base of the front wiper 262 attached to the cabin C, the jet portion of the front glass washer (not shown), or the like. Since the cover rear portion 33 has the heat exhaust holes 34 which are elongated holes extending in the left-right direction, the exhaust heat discharged through the heat exhaust holes 34 serves as a defroster when it is contacted by the front glass portion 226 of the cabin C arranged adjacent thereto. As a result, efficient use of the exhaust heat can be obtained.

While a preferred embodiment of the present invention has been described above, the present invention is not limited to such a specific embodiment, but various changes and modifications can be made within the scope of the essence of the present invention as set forth in the claims.

REFERENCE SIGNS LIST

A1 ROPS type tractor
A2 cabin type tractor
2 motor unit
3 operation unit
25 dashboard
30 heat exhaust cover (cabin type)
90 heat exhaust cover (ROPS type)
100 hot-wind blocking plate (ROPS type)
200 hot-wind blocking plate (cabin type)
202 wiper shaft hole
203 outer edge portion
214 upper end edge portion
228 wiper

The invention claimed is:

1. A tractor comprising:
a motor unit comprising an engine; and
an operation unit arranged at a rear of the motor unit;
a hood covering the motor unit; and
a heat vent cover disposed at a front of the operation unit, the heat vent cover defining a heat vent hole, the heat vent cover configured to be positioned between the hood and the operation unit, and
wherein the heat vent hole is an elongated hole extending in a front-rear direction of a machine body, with a front end of the heat vent hole directed inward and a rear end of the heat vent hole directed outward.

2. The tractor of claim 1, wherein the heat vent cover is configured to direct vent heat of the motor unit through the heat vent hole and outside of the machine body.

3. The tractor of claim 1, wherein the heat vent cover defines a plurality of heat vent holes that include the heat vent hole, the plurality of heat vent holes positioned at intervals with respect to a left-right direction.

4. The tractor of claim 3, wherein the plurality of heat vent holes are arranged left-right line-symmetrically and inclined.

5. An apparatus comprising:
a heat cover configured to be disposed between a hood and a dashboard of a work vehicle,
the heat cover configured to be positioned between the hood and an operation unit, and
the heat cover defining a first set of openings, each opening of the first set of openings having:
a first dimension extending along a corresponding first axis that is angularly disposed relative to a centerline of the heat cover;
a second dimension that is orthogonal to the first dimension; and
a first portion of the opening closer to the centerline than is a second portion of the opening.

6. The apparatus of claim 5, wherein the heat cover defines:
a plurality of openings including:
the first set of openings positioned on a first side of the centerline; and
a second set of openings positioned on a second side of the centerline; and
the first set of openings are symmetric to the second set of openings about the centerline.

7. The apparatus of claim 6, wherein:
the first dimension is greater than the second dimension;
the first axis is angularly disposed relative to the centerline by a first angle; and
each opening of the second set of openings extend along a corresponding second axis that is angularly disposed relative to the centerline by a second angle that is equal to and opposite of the first angle.

8. The apparatus of claim 7, wherein:
the first and second angle are non-orthogonal to the centerline;
the first axis and the second axis intersect;
the first set of openings are spaced at equal intervals with respect to a left-right direction that is substantially orthogonal to the centerline; and
the second set of openings are spaced at equal intervals with respect to the left-right direction.

9. The apparatus of claim 6, wherein:
the heat cover defines:
a first end that defines one or more flanges configured to couple the heat cover to a wind blocking plate disposed between the hood and the dashboard;
a second end;
an upper surface that extends between the first end and the second end and defines an inverted U shape; and
a lower surface that opposes the upper surface; and
the plurality of openings extend between the upper surface and the lower surface.

10. The apparatus of claim 9, wherein:
each opening of the first set of openings includes a first portion that is closer to the first end than is a second portion of the opening; and
the first portion is closer to the centerline than is the second portion.

11. The apparatus of claim 9, wherein the upper surface defines:
a plurality of guide pieces protrude over at least portion of a respective heat opening of the plurality of openings;
a first edge portion that defines a first recess at the first end of the heat cover; and
a second edge portion that defines a recess at the second end of the heat cover.

12. The apparatus of claim 11, wherein:
the plurality of guide pieces are positioned such that heat discharged from the first set of openings is directed toward a left side of the hood and heat discharged from the second set of openings is directed toward a right side of the hood; and
the work vehicle includes a tractor.

13. The apparatus of claim 5, wherein the work vehicle includes a tractor.

14. A tractor comprising:
a blocking plate disposed between a motor unit and an operation unit of a tractor;
a dashboard coupled to a first side of the blocking plate;
a hood configured to cover the motor unit; and a heat cover coupled to a second side of the blocking plate, the heat cover positioned between the blocking plate and the hood, the heat cover defining:
  a plurality of openings that include:
    a first set of openings extending along a first axis that is angularly disposed relative to a centerline of the hood; and
    a second set of openings extending along a second axis that is angularly disposed relative to the centerline of the hood.

15. The tractor of claim 14, wherein each opening of the plurality of openings include:
  a first end; and
  a second end that is opposite the first end, the second end positioned further from the centerline of the hood than is the first end.

16. The tractor of claim 15, wherein the first end of each of the first set of openings is positioned closer to the hood than is the second end each of the first set of openings.

17. The tractor of claim 16, wherein the second end of each of the second set of openings is positioned closer to the blocking plate than is the first end each of the second set of openings.

18. The tractor of claim 16, wherein:
  the second end of each of the first set of openings is spaced apart from the blocking plate by a first distance measured parallel to the centerline; and
  the second end of each of the second set of openings is spaced apart from the blocking plate by the first distance.

19. The tractor of claim 18, wherein:
  the first set of openings includes three or more openings; and
  the second set of openings includes three or more openings.

20. The tractor of claim 16, wherein:
  the first axis is angularly disposed relative to the centerline by a first angle and the second axis is angularly disposed relative to the centerline by the first angle; and
  the first angle is substantially equal to 45 degrees.

* * * * *